(12) United States Patent
Aronoff

(10) Patent No.: US 11,048,406 B2
(45) Date of Patent: Jun. 29, 2021

(54) METHODS AND SYSTEMS FOR DEFINING AND TRANSMITTING A DRAWING STROKE

(71) Applicant: Facebook, Inc., Menlo Park, CA (US)

(72) Inventor: Brendan Benjamin Aronoff, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 211 days.

(21) Appl. No.: 15/646,613

(22) Filed: Jul. 11, 2017

(65) Prior Publication Data
US 2019/0018581 A1 Jan. 17, 2019

(51) Int. Cl.
| | |
|---|---|
| G06F 3/0488 | (2013.01) |
| H04L 12/58 | (2006.01) |
| H04M 1/72436 | (2021.01) |
| H04M 1/72439 | (2021.01) |
| G06F 3/0485 | (2013.01) |
| G06F 3/0482 | (2013.01) |

(52) U.S. Cl.
CPC .......... *G06F 3/04883* (2013.01); *H04L 51/10* (2013.01); *H04L 51/32* (2013.01); *H04M 1/72436* (2021.01); *H04M 1/72439* (2021.01); *G06F 3/0482* (2013.01); *G06F 3/0485* (2013.01); *H04L 51/04* (2013.01)

(58) Field of Classification Search
CPC .. G06F 3/04883; G06F 3/0482; G06F 3/0485; H04L 51/04; H04L 51/10; H04L 51/32; H04M 1/72552; H04M 1/72436; H04M 1/72439
See application file for complete search history.

(56) References Cited

U.S. PATENT DOCUMENTS

| | | | |
|---|---|---|---|
| 9,444,898 B1 * | 9/2016 | Cheng ...................... H04L 67/20 |
| 2003/0163525 A1 * | 8/2003 | Hendriks ............... G06Q 10/10 709/204 |
| 2015/0309720 A1 * | 10/2015 | Fisher ................ G06F 3/04845 715/752 |
| 2016/0219149 A1 * | 7/2016 | Krishnan ........... G06Q 10/0631 |
| 2017/0109338 A1 * | 4/2017 | Page ..................... G06F 17/241 |
| 2017/0213366 A1 * | 7/2017 | Kangas ............... G06F 3/04883 |
| 2017/0222959 A1 * | 8/2017 | Devasthali .............. H04L 51/02 |

* cited by examiner

*Primary Examiner* — Jennifer N To
*Assistant Examiner* — Parmanand D Patel
(74) *Attorney, Agent, or Firm* — Kacvinsky Daisak Bluni PLLC

(57) ABSTRACT

Exemplary embodiments relate to techniques for creating drawings in communications applications. When the system registers a sustained haptic contact signal, further contacts may generate drawings to be overlaid onto a message thread. While the contact is sustained, each swipe may create a new stroke that is transmitted on a real-time data channel. A new layer may be defined over the messages, having its own coordinate system. The drawing may be recreated on the recipient client by drawing the strokes on the new layer. Each participant may see the drawing displayed over their message thread. The drawing may scroll with the messages, or may be displayed in the same place on the screen until cleared by some action from the sender or recipient.

17 Claims, 23 Drawing Sheets

Sending Client Side
Drawing Stroke Logic
*400*

Receiving Client Side
Drawing Processing Logic
*430*

Client Display Update
Logic
*450*

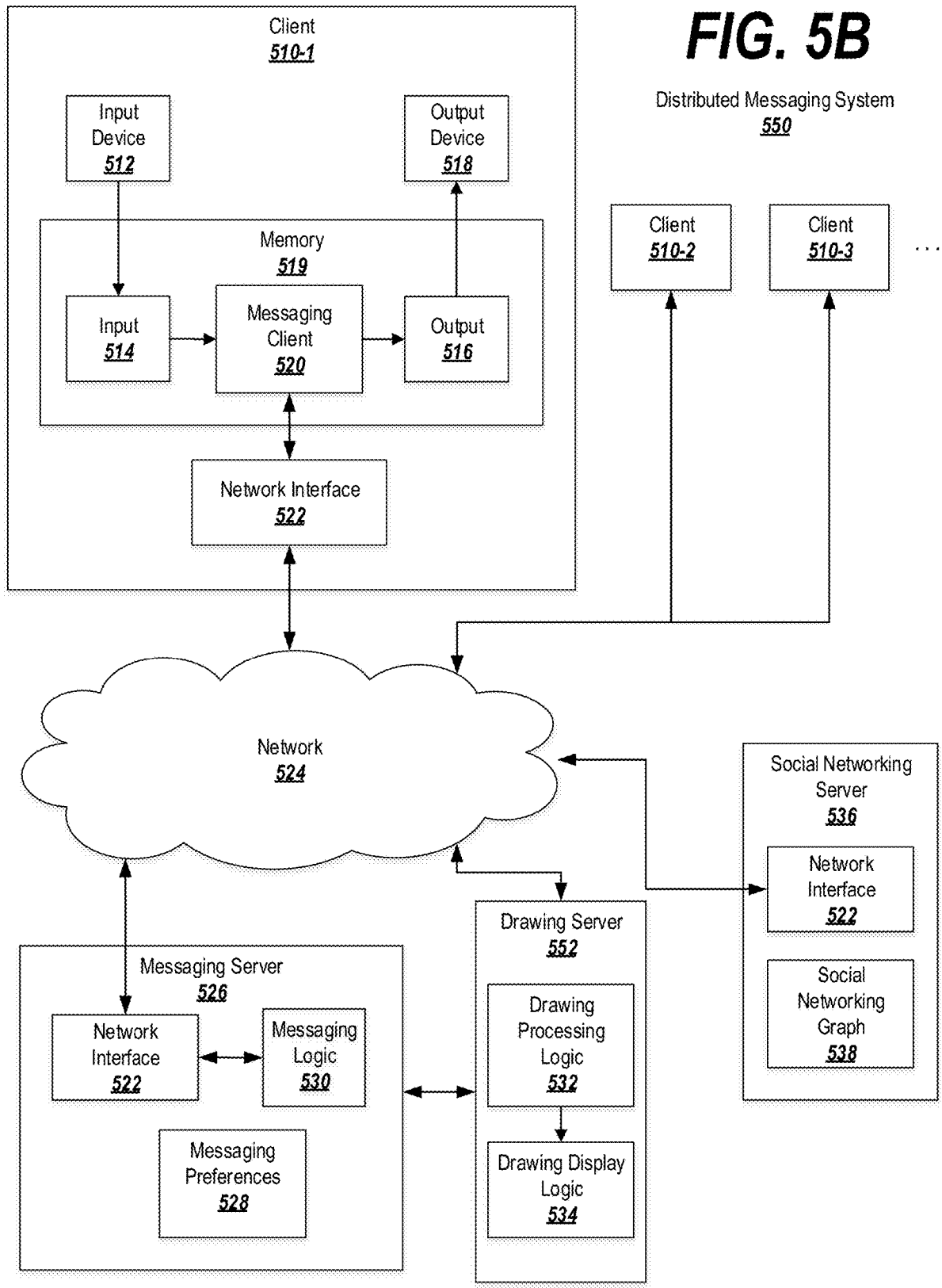

METHODS AND SYSTEMS FOR DEFINING AND TRANSMITTING A DRAWING STROKE

BACKGROUND

Messaging systems, such as instant messaging systems and short message service ("SMS") systems, allow users to communicate with each other by exchanging messages. Messaging systems may allow a sending user to transmit messages to one or more receiving users. Typically, such messages may include text or media such as an image or video.

BRIEF DESCRIPTION OF THE DRAWINGS

FIG. 5B is a block diagram providing an overview of a system including an exemplary distributed messaging service;

DETAILED DESCRIPTION

Figure 1A:
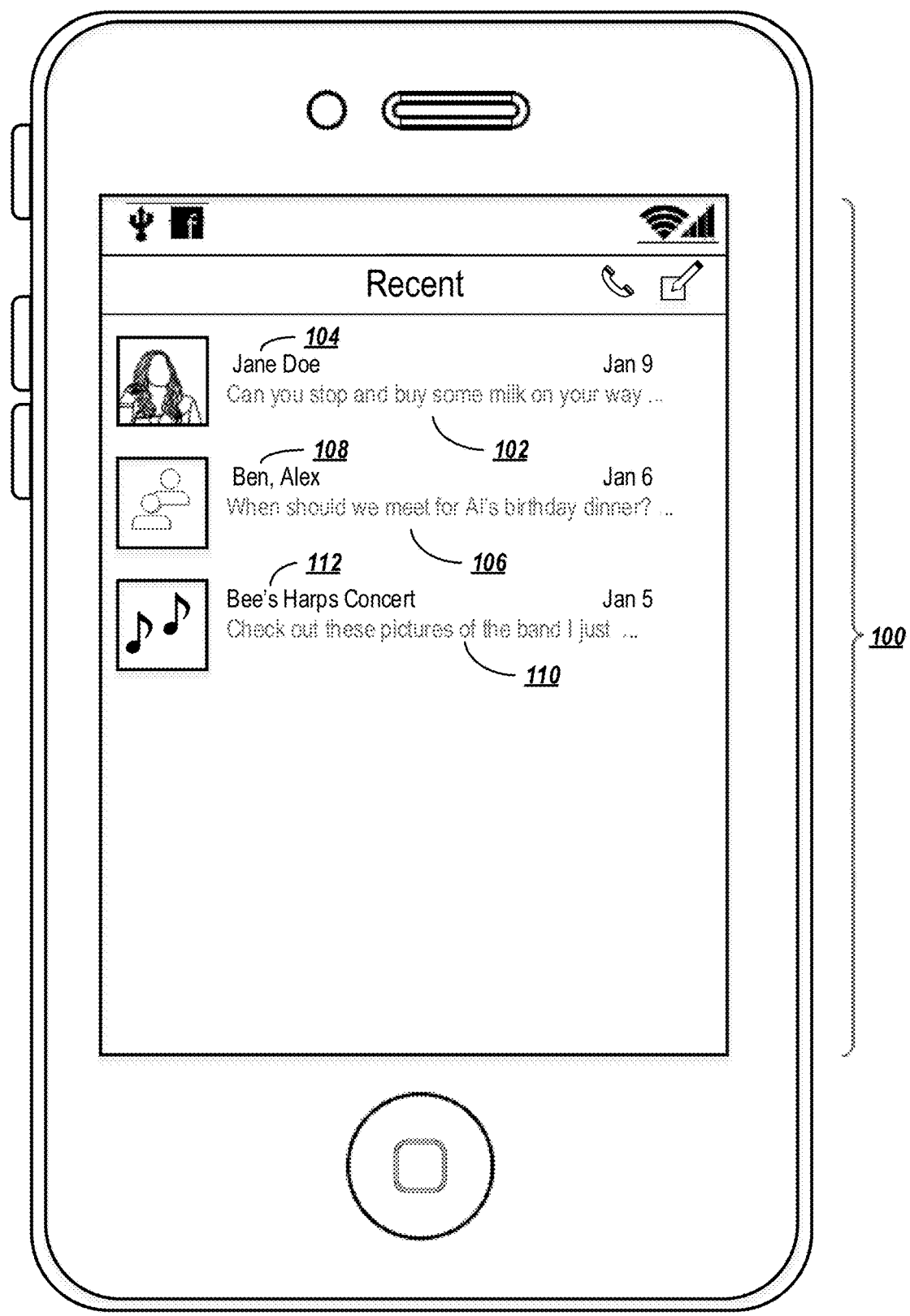
FIG. 1A depicts an exemplary messaging interface including several types of individual and group messages.

Some messaging systems may allow a user to transmit hand-drawn images, such as a signature, as media in a conversation. In order to transmit such an image, a user may need to generate the hand-drawn image in a separate drawing application, save the drawing as an image in a photo album or camera roll, and then upload the image to the messaging service. This may be a non-intuitive process involving multiple steps, which may be difficult for a user to perform efficiently (particularly during an active conversation).

One potential solution to this problem is to integrate drawing functionality into the messaging application. For example, some messaging applications allow a user to select an icon in a message creation interface to add an image or video to a message. A similar icon could be presented which, when selected, presents the user with a drawing interface. The user could create a hand-drawn image in the interface, and then transmit the drawing as is typically done for transmitting an image.

Although this potential solution offers some advantages over generating the drawing from a separate application (e.g., reducing the number of steps required to generate and upload the drawing), such a solution still suffers from several problems. For example, multiple steps are still required to generate the drawing (e.g., selecting the drawing generation icon, interacting with the drawing interface, confirming that the drawing is finished, etc.). Thus, the process remains relatively complicated and non-intuitive.

Furthermore, such a process only allows drawings to be transmitted as conventional messages. This may lead to ambiguities. For example, a first user may transmit a first message, and a second user may wish to react to the first message with a hand-drawn image (e.g., by drawing a check mark, thumbs-up, or smiley face). While the user is drawing the image, the first user may transmit a second message. When the second user transmits the drawing (e.g., following the transmission of the second message), the drawing may appear as a third message in the conversation. It may thus be unclear whether the message including the drawing is in response to the first message or the second message.

Exemplary embodiments described herein pertain to improvements in messaging systems, and in particular provide improved techniques for adding drawings to conversations. Although exemplary embodiments are described with reference to messaging systems (e.g., focusing on the transmission of text and other media in the form of a conversation thread), the techniques described may also be applied to other forms of conversation (e.g., video conversations, including live video conversations).

Exemplary embodiments relate to techniques for creating drawings in communications applications (e.g., messaging, video, or other communications applications). When the system registers a sustained haptic contact signal, further touches may generate drawings to be overlaid onto a message thread. While the contact is sustained, each swipe may create a new stroke that is transmitted on a real-time data channel.

A new layer may be defined over the messages, having its own coordinate system. The drawing may be recreated on the recipient client by drawing the strokes on the new layer. Each participant may see the drawing displayed over their message thread.

The drawing may scroll with the messages, or may be displayed in the same place on the screen until cleared by some action from the sender or recipient. The drawing may be displayed on the recipient's device (e.g., in a communication thread) in a number of ways: without regard to the way that the messages of the thread are displayed; by moving the messages so that the drawing appears consistent on the sender's device and the recipient's device; or, the drawing was initially created by sustaining contact on a particular message, that message may be rearranged to appear consistently on each device, while the other messages may remain unchanged.

These embodiments allow a user to enter drawing mode relatively quickly and efficiently. Furthermore, the entire communications interface becomes a canvas for drawings, instead of the drawings being contained within individual messages. Moreover, because adding a drawing to a messaging interface is straightforward, users may be more inclined to utilize the drawing capabilities of the messaging application—for example, using the embodiments described herein, a user may be more inclined to draw a smiley face or a check mark rather than searching for a predefined image such as a GIF.

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided As an aid to understanding, a series of examples will first be presented before detailed descriptions of the underlying implementations are described. It is noted that these examples are intended to be illustrative only and that the present invention is not limited to the embodiments shown.

Exemplary Interfaces

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-*a* may include components 122-1, 122-2, 122-3, 122-4, and 122-5. The embodiments are not limited in this context.

Users may interact with a messaging system through a client application. FIG. 1A depicts an example of a client application displaying a messaging interface 100. The messaging interface 100 of FIG. 1A shows an exemplary summary screen that provides an overview of messages recently sent to (or by) the user of the client application.

Messaging systems may support a variety of different types of messages. For example, the messaging interface 100 includes a summary of a one-to-one (or individual) message 102. A one-to-one message is a message exchanged between two entities, so that only the two entities can see and participate in the conversation. For example, in the one-to-one message 102, the current user (Jack Doe) recently received a message from his wife, Jane Doe. The other participant in the conversation is indicated in the interface 100 using an identifier 104 (including a name and profile picture, in this example). Only Jack and Jane participate in the conversation, and only Jack and Jane can view the conversation.

Another message type supported by the messaging system is a group conversation. In a group conversation, multiple users see and participate in the conversation. FIG. 1A depicts an exemplary summary of a group conversation 106. In the summary of the group conversation 106, each of the other users participating in the conversation is indicated by respective identifiers 108. In this case, the identifiers include the names or handles of the other users participating in the group conversation, and an icon to indicate that the conversation is a group conversation. For example, in this case the current user (Jack) is participating in a conversation with his friends Ben and Alex. Jack, Ben, and Alex can each see all of the messages in the conversation (regardless of who sent the message) and can send messages to the group.

Another type of message supported by the messaging system is a message between one or more users and an organization (such as a business) or event. For example, FIG. 1A shows an event message 110 sent by the current user (Jack) to the page of an event being organized through a social network. The identifier 112 identifies the name of the event, and an icon is presented identifying this particular event is a concert. In an event message 110, all participants in the event (as a participant is defined, e.g., by the event's social networking page) can view and send event messages 110. Participants may include, for example, people attending the event, fans of the event that have signed up with the event's page to receive messages about the event, event organizers, etc.

The interface 100 includes interface elements allowing the user to create a new message or conversation. Moreover, by selecting an existing message summary 102, 106, 110, the user can view messages in an existing conversation and add new messages to the conversation.

Figure 1B:
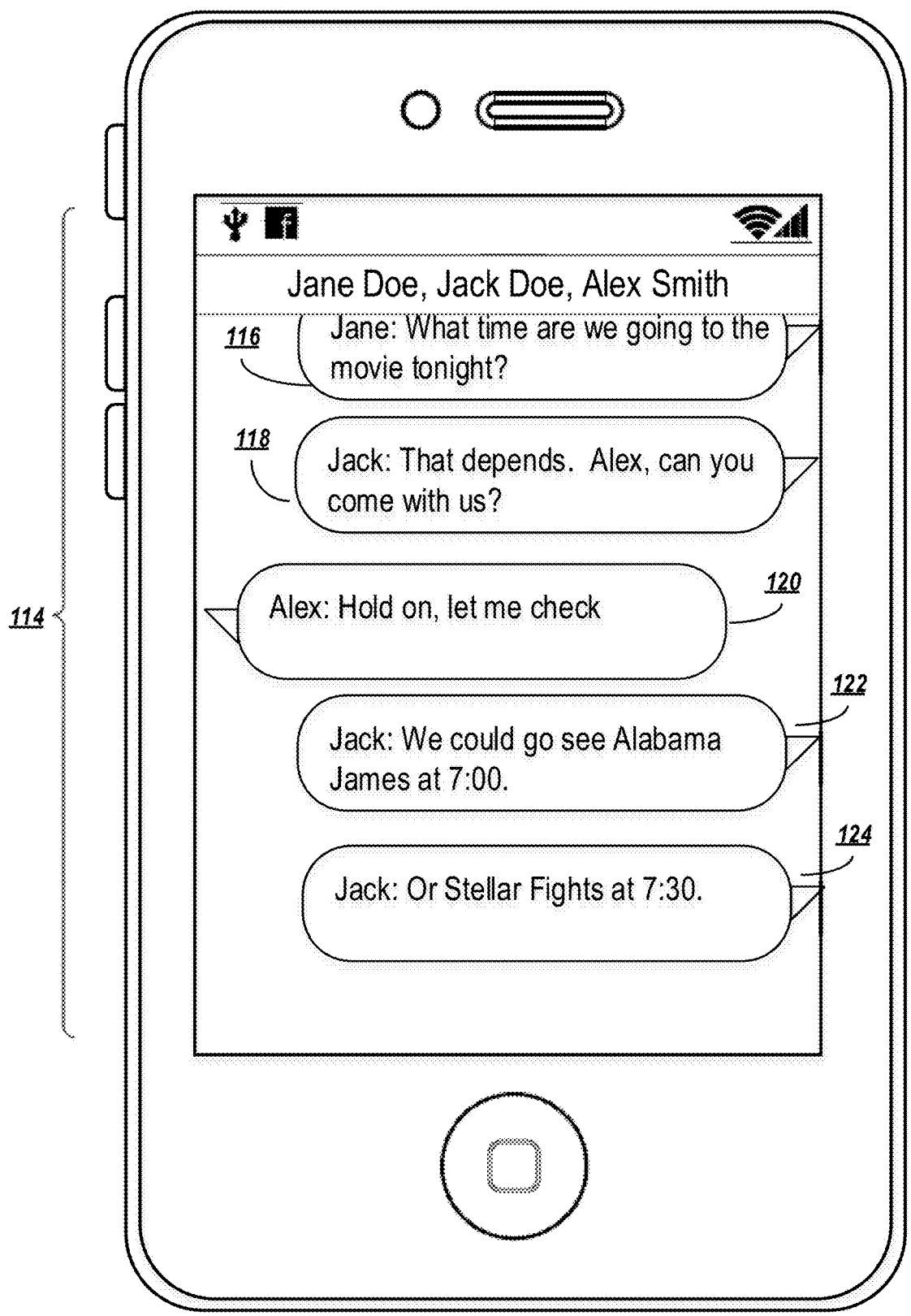
FIG. 1B depicts an example of a view of a conversation.

For example, FIG. 1B depicts a conversation viewer interface 114 of the messaging client application depicting a view of a conversation. In the interface 114, one or more messages may be displayed. The messages may be assigned to a particular conversation by associating a thread identifier (thread ID) with each message. The thread ID may be uniquely assigned to the conversation so that messages having the same thread ID appear in connection with the same conversation. In the example depicted in FIG. 1B, several messages 116, 118, 120, 122, 124 are associated with the conversation and therefore displayed in the conversation viewer interface 114.

According to exemplary embodiments, a user may add drawings to the conversation viewer interface 114. In order to enter a drawing mode, the user may interact with a touch screen on their device by initiating and sustaining haptic contact with the display. For example, in FIG. 1C, a user presses their finger to the display in the location indicated by the contact area 126. Whenever haptic contact is registered on the display, a contact point 128 of the contact may be defined. Although spread over a certain area of the display, the contact point 128 may be used to define a particular location at which the contact will be registered, e.g. to allow for more fine control over haptic input. The contact point 128 may be, for example, a center point in the contact area 126. Alternatively, the contact point 128 may be offset from the center point (e.g., in order to allow users to see the strokes that they are drawing without the strokes being obfuscated by their finger).

The haptic contact may be registered by the operating system at a certain location (e.g., in an X/Y coordinate plane) on the display. According to exemplary embodiments, a coordinate system 130 may also be defined with respect to the communications viewer interface 114 of the messaging application (as shown for example in FIG. 1C). For certain purposes, it may be helpful to know where haptic contacts have occurred relative to the messages of the conversation. Therefore, the coordinate system 130 may be defined relative to the messages in the displayed conversation. For example, as the user scrolls through the conversation, the coordinate system 130 may move as well. Alternatively or in addition, the coordinate system 130 may remain in a fixed position as the messages are scrolled, and a translation factor may be applied to haptic contacts with respect to the coordinate system 130 based on the amount of scrolling in order to translate the haptic contacts from their original position on the display to a corresponding corrected location within a scrolled conversation.

When the user initiates haptic contact, the operating system may register the contact as a contact initiation event at an X/Y location on the display. When the user releases the contact, the operating system may register the release as a contact release event. If the user moved their finger between haptic contact initiation and haptic contact release, then the release event may also be associated with an X/Y location representing the point at which contact was released. In some embodiments, the operating system may also register intermediate locations between the haptic contact initiation point and haptic contact release point (e.g., to better represent curves or other shapes drawn by a user). Applications, such as the messaging application depicted, may register with the operating system to receive reports of haptic contact and haptic release (which may include the X/Y location of contact and release, and reports of intermediate locations between haptic contact and haptic release).

The coordinate system 130 of the application may be defined with respect to the messages of the conversation, and may include a visible area less than the size of the full display. For example, the operating system may register haptic inputs across the full length and width of the display surface, whereas the coordinate system 130 may be defined only with respect to the portion of the display dedicated to displaying the conversation (e.g., the shaded area in FIG. 1C). Moreover, as noted above, the coordinate system 130 and/or objects within the coordinate system may be moved relative to where they originated. Thus, the messaging application may translate the X/Y location on the display to an X/Y location in the coordinate system 130 and/or may apply a translation factor to move displayed elements, such as drawing strokes, in the coordinate system 130.

In some embodiments, a contact may be considered to be sustained after a haptic contact report is received until a haptic release report is received. Alternatively, a signal may be sent to the application as long as the contact is sustained. In some embodiments, it is not necessary that the user maintains their initial finger contact in the same location in order to sustain contact. The initial finger contact may stray from the initial contact area and may even move outside the area of the conversation (e.g., the area encompassed by the coordinate system), as long as the contact is sustained in an area that the operating system is capable of registering as a contact location.

While a user sustains a first haptic contact, the user may be considered to be in a drawing mode. Subsequent haptic contacts while the first contact is sustained may define drawing strokes, which may be superimposed on the communications viewer interface 114.

Figure 1C:
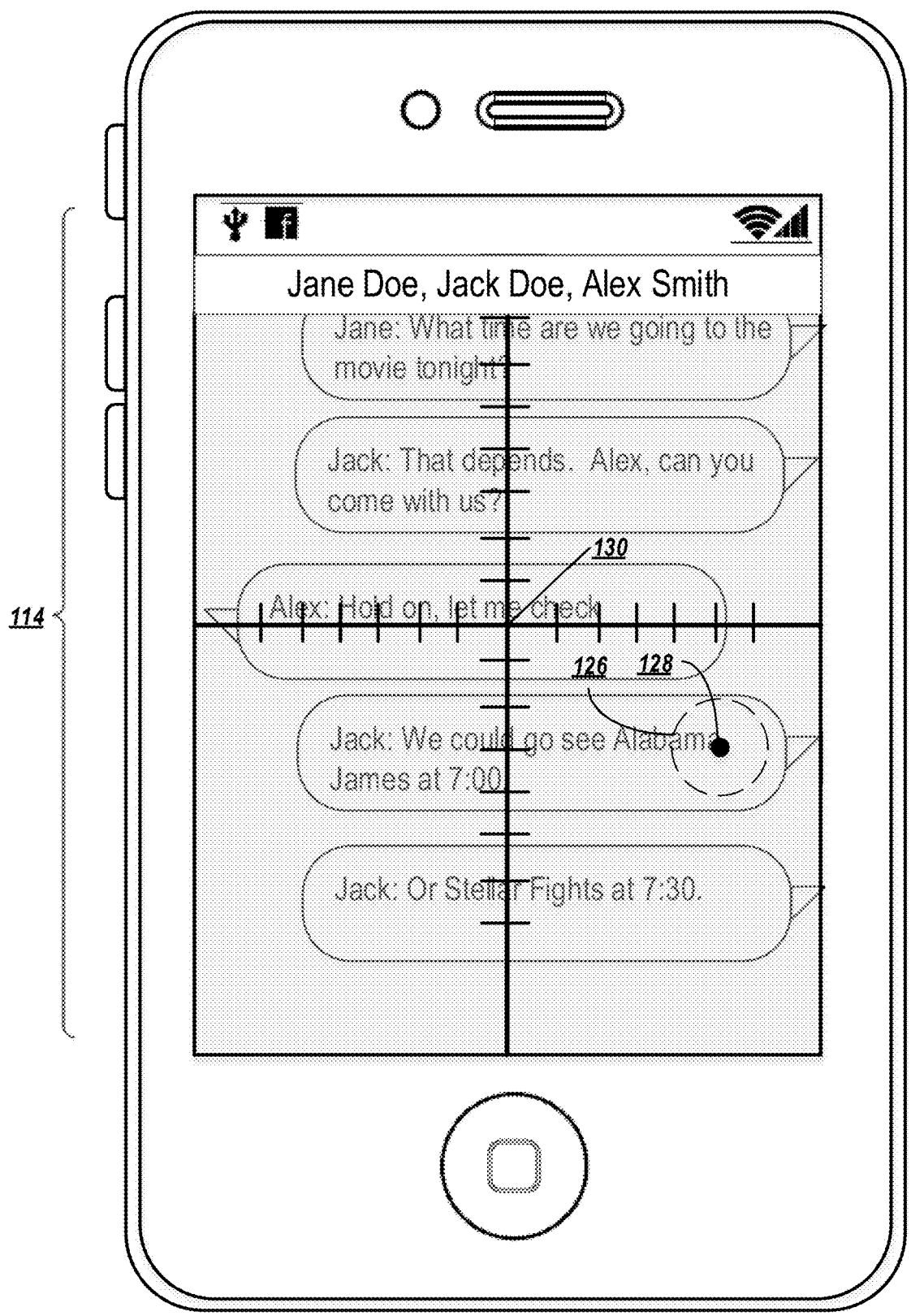
FIG. 1C depicts an example of an interface on which a first haptic contact is registered.
Figure 1D:
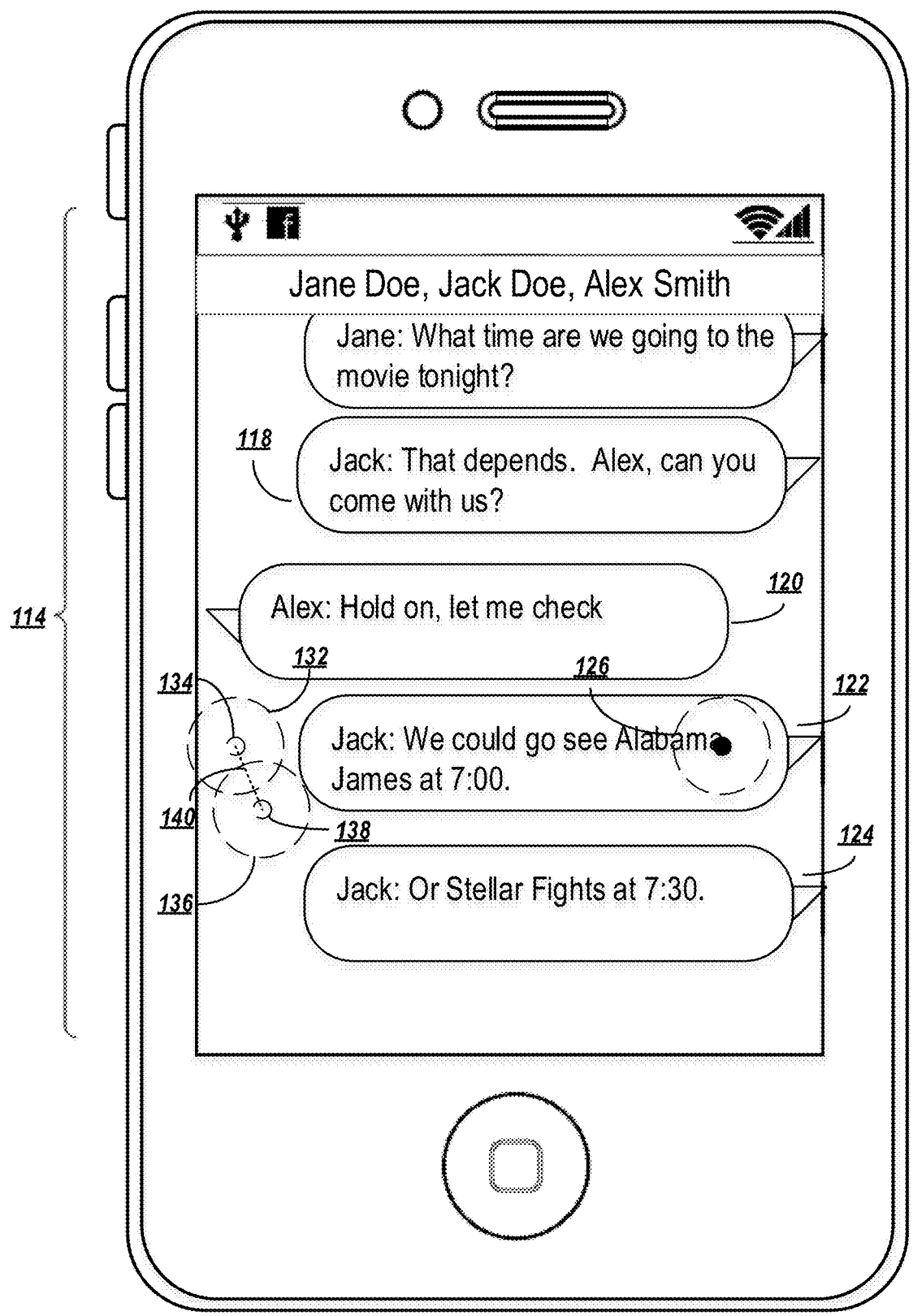
FIG. 1D depicts an example of registering a second haptic contact on the interface of FIG. 1C.

For example, FIG. 1D depicts an example of registering a second haptic contact on the interface of FIG. 1C while the first contact (indicated by contact area 126) is sustained. In this example, the user initially makes contact with the display in a first contact area 132. Then, while sustaining contact with the screen (with both the initial finger in the contact area 126 and the second finger that initially makes contact in the first contact area 132), the user moves their (second) finger to a second contact area 136.

As with the initial contact, contact points 134, 138 may be defined in the first and second contact areas 132, 136. The application may draw a line 140 between the first contact point 134 and the second contact point 138. If the user does not draw a single straight line while sustaining contact (e.g., the user draws a curved line, or stops drawing in one direction and then changes to a new direction while maintaining contact), the system may register one or more intermediate points connected by lines, or may define a curved line or other shape between the first contact point 134 and the second contact point 138.

As an alternative to defining strokes based on sustained haptic contact with the second finger, the user may sustain contact with a first finger (to enter drawing mode) and select one or more points with a second finger. The system may then define drawing strokes between the points.

Figure 1E:
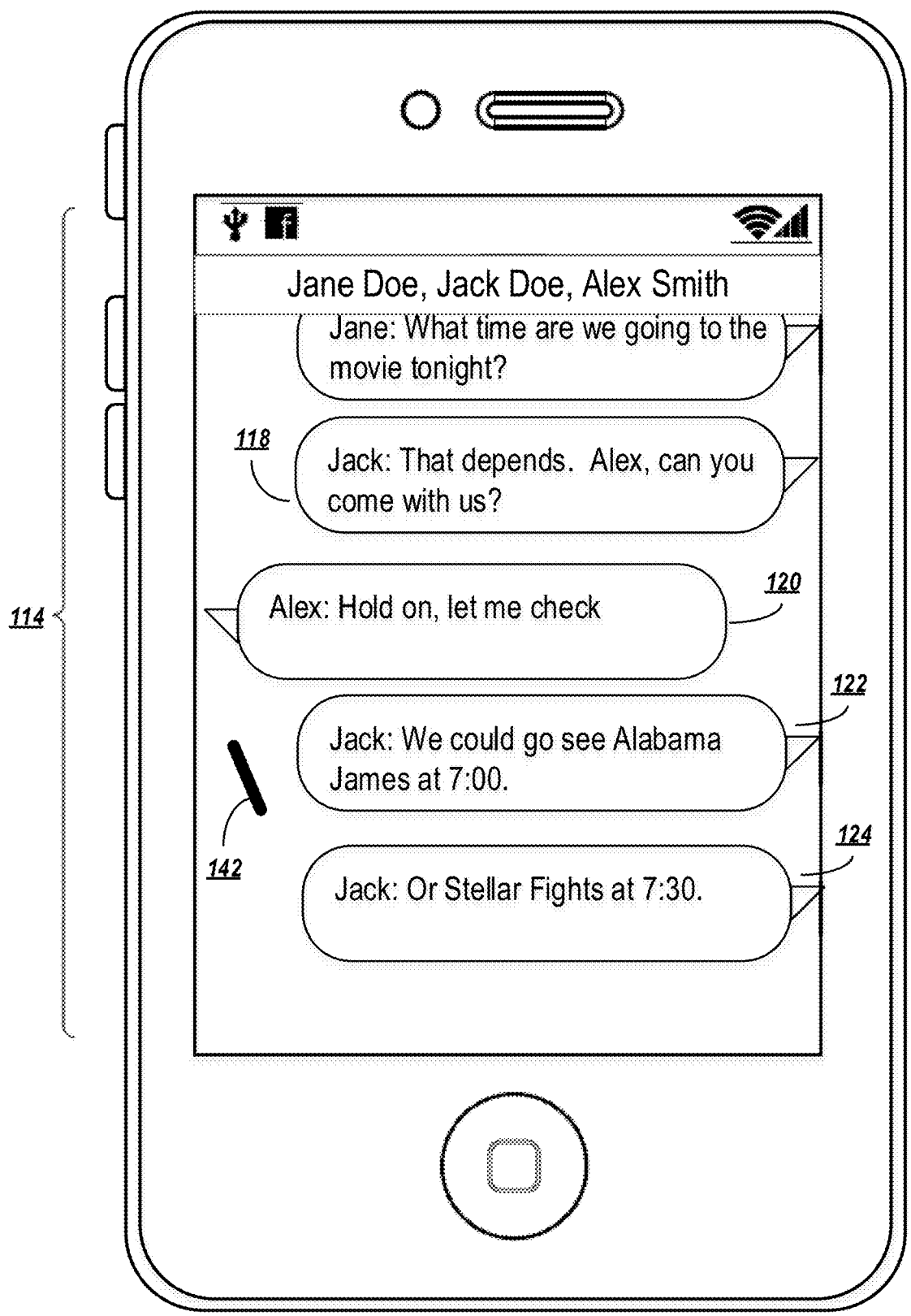
FIG. 1E depicts an example of a first drawing stroke drawn on the interface in the location indicated by the second haptic contact.

However the line 140 is defined, the line 140 may serve as the basis for a drawing stroke 142, as shown in FIG. 1E. The drawing stroke 142 may be a line or other shape drawn on the communications viewer interface 114. The drawing stroke 142 may have a shape, thickness, color, or other property or properties that is/are configurable by a user of the messaging application. The interface 114 may present one or more options for configuring the properties while the user is in drawing mode (e.g., while an initial contact is sustained) or through a menu or interface icon.

The application may transmit each drawing stroke 142 as the drawing strokes are generated. Transmitting the drawing stroke 142 may involve transmitting a starting location and an ending location of the drawing stroke in the coordinate system. If the drawing stroke 142 is a curve or other shape, the application may transmit other information allowing the shape to be recreated (e.g., a degree of curvature, a length, etc.). The other information may be defined with reference to the coordinate system. The application may transmit with the drawing stroke any configurable properties (e.g., stroke thickness, color, etc.) used to create the drawing stroke. If a value is not specified for a configurable property, a default value may be used to recreate the drawing stroke 142.

Each drawing stroke 142 may be transmitted in a real time data channel (RTC) as the stroke 142 is drawn. For example, when the system registers that a user has ended a drawing stroke by lifting their second finger (e.g., a haptic contact release for the finger that was used to define the drawing stroke), the stroke may be transmitted. As a result, the drawing stroke may be recreated on each recipients' interface 114 in real time, as a drawing is created.

Alternatively, the system may buffer drawing strokes while the initial haptic contact with the first finger (used to enter drawing mode) is sustained. The user may define one or more drawing strokes while in drawing mode, which may be aggregated together and batch transmitted when the user exits drawing mode (e.g., by releasing the first finger, thereby generating a haptic contact release signal). In such embodiments, a drawing may be recreated in its entirety on the interface 114 when the drawing is complete.

The drawing may be displayed on the conversation viewer interface 114 of each conversation participants' device. In some embodiments, the user that originated the drawing may be permitted to clear the drawing (e.g., through a gesture or other command). For instance, the user may select a portion of the drawing with a haptic contact and then drag the drawing off-screen (or to a designated portion of the screen, such as a trash can icon) to delete the drawing. In a similar manner, the user may drag the drawing around the screen to reposition the drawing.

In some embodiments, the drawing may also be clearable (in a similar fashion) by the other conversation participants. If another participant deletes the drawing, the drawing may be deleted on the participant's interface 114 with or without clearing the drawing from other participants' interfaces 114.

Figure 1F:
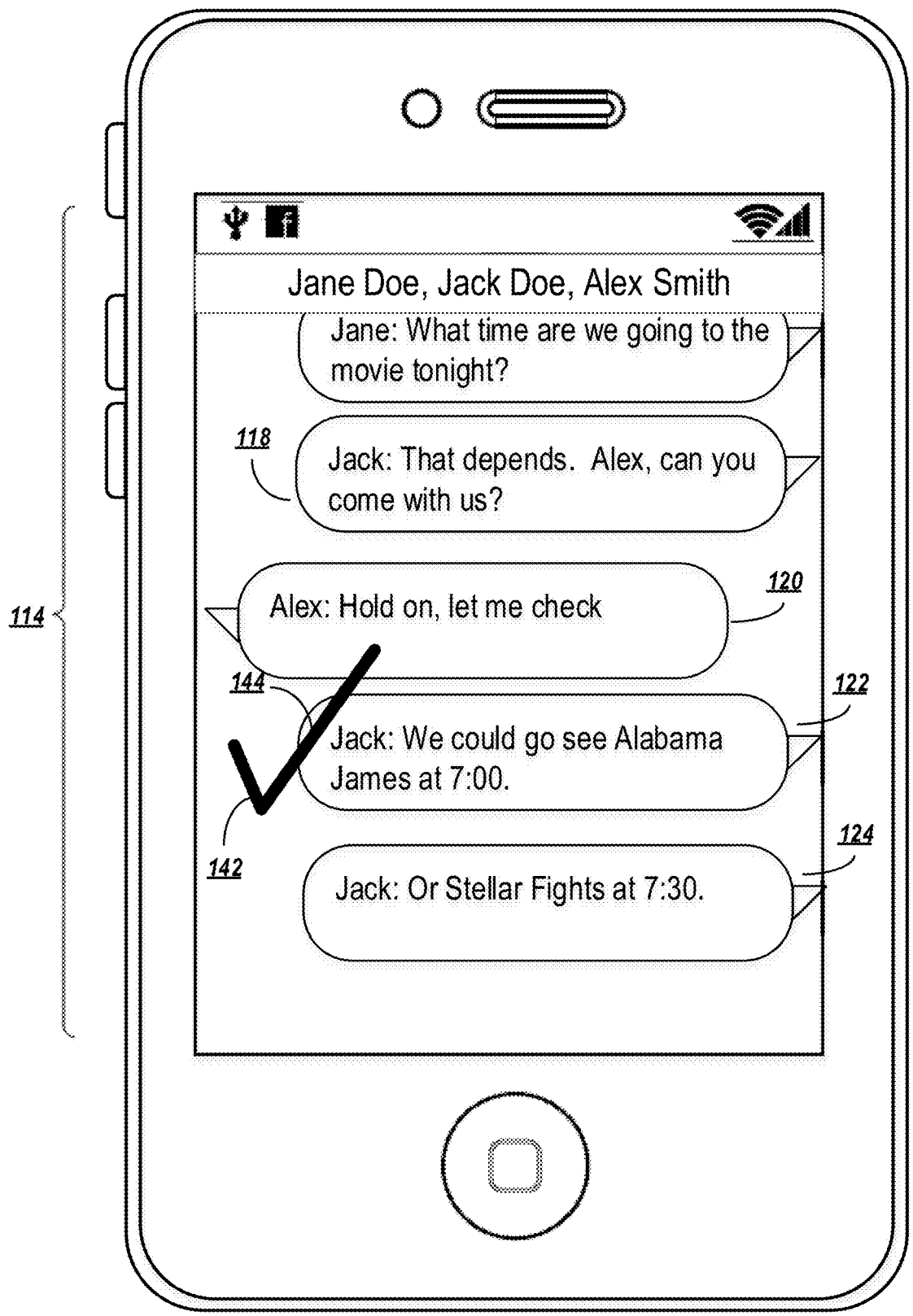
FIG. 1F depicts an example of a drawing as depicted on a sending device.

FIG. 1F depicts an example of a completed drawing as depicted on a sending device. In this example, after releasing the haptic contact in the second contact area 136 (FIG. 1D), the user defined a further stroke 144 in order to draw a checkmark in the vicinity of one of the messages 122 of the conversation.

In some cases, the user may simply wish to draw an image without regard to where the image appears on the screen (e.g., drawing a smiley face, or writing "BYE!" across the screen). In other cases, the user may draw the image with the intent of referencing a particular message or location in the context of the conversation. However, a problem may arise in that conversations may not be displayed consistently across devices. For example, on a sender's device, all of the sender's messages may appear on one side of the screen, while all other conversation participants' messages may appear on the other side of the screen. The examples of FIGS. 1B-1F, for instance, show the messages of the sending user (Alex) on the left side, while the other conversation participants (Jane and Jack) are on the right side. However, from the perspective of one of the other conversation participants, the messages may appear differently.

Figure 1G:
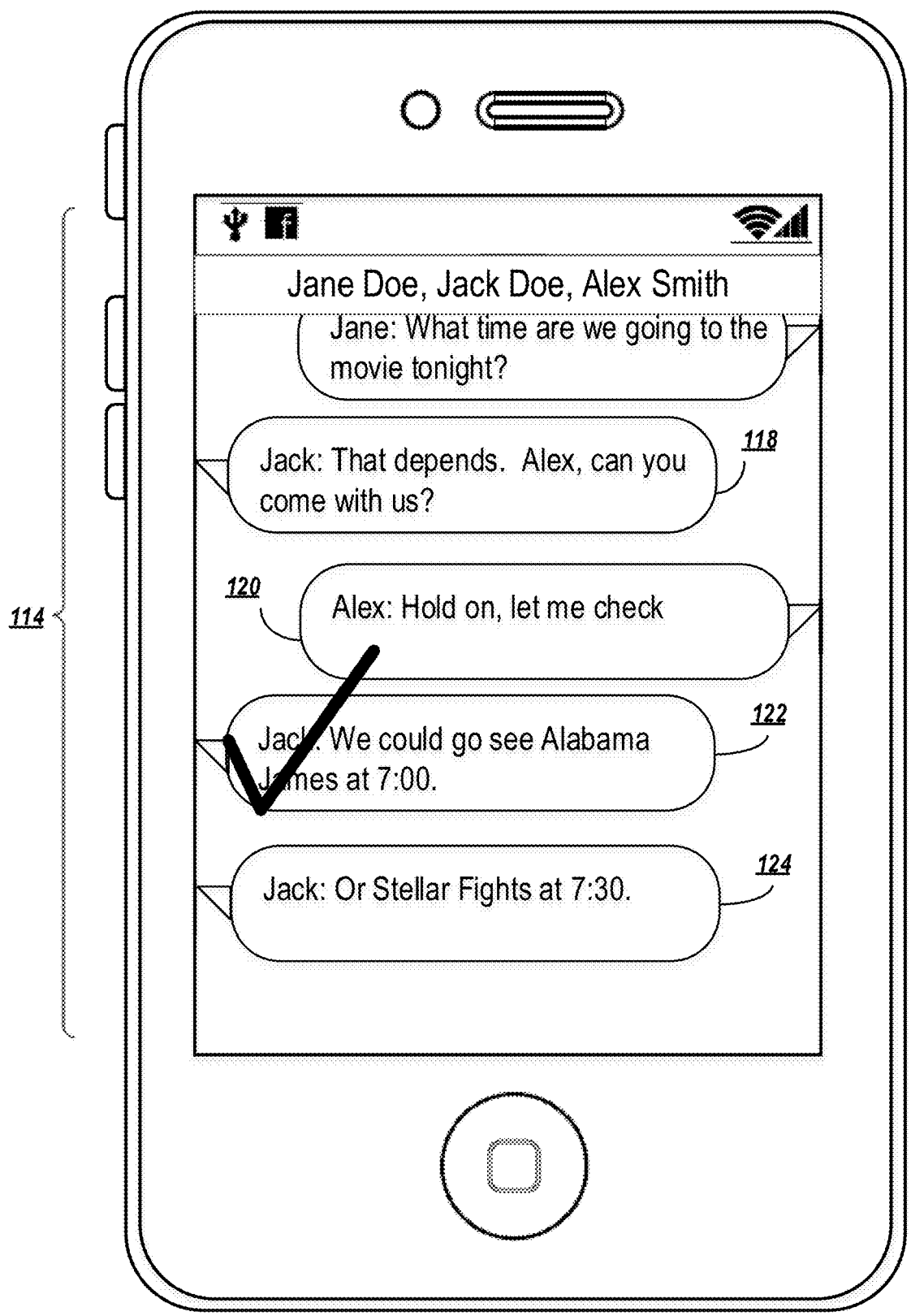
FIG. 1G depicts an example of the drawing of FIG. 1F as depicted on a receiving device without moving messages in the conversation.

For instance, if the same message display format (sender on left, other participants on right) were applied to Jack's device, the display may appear in a form similar to that depicted in FIG. 1G. By displaying the drawing in the same location on the coordinate plane, graphical inconsistencies my arise between the sender and recipient displays (e.g., the drawing covers a portion of the message 122 in this example).

Although perhaps sub-optimal in some cases, the embodiment of FIG. 1G (in which the drawing is displayed without moving the messages of the conversation) remains one option for displaying the drawing.

Figure 1H:
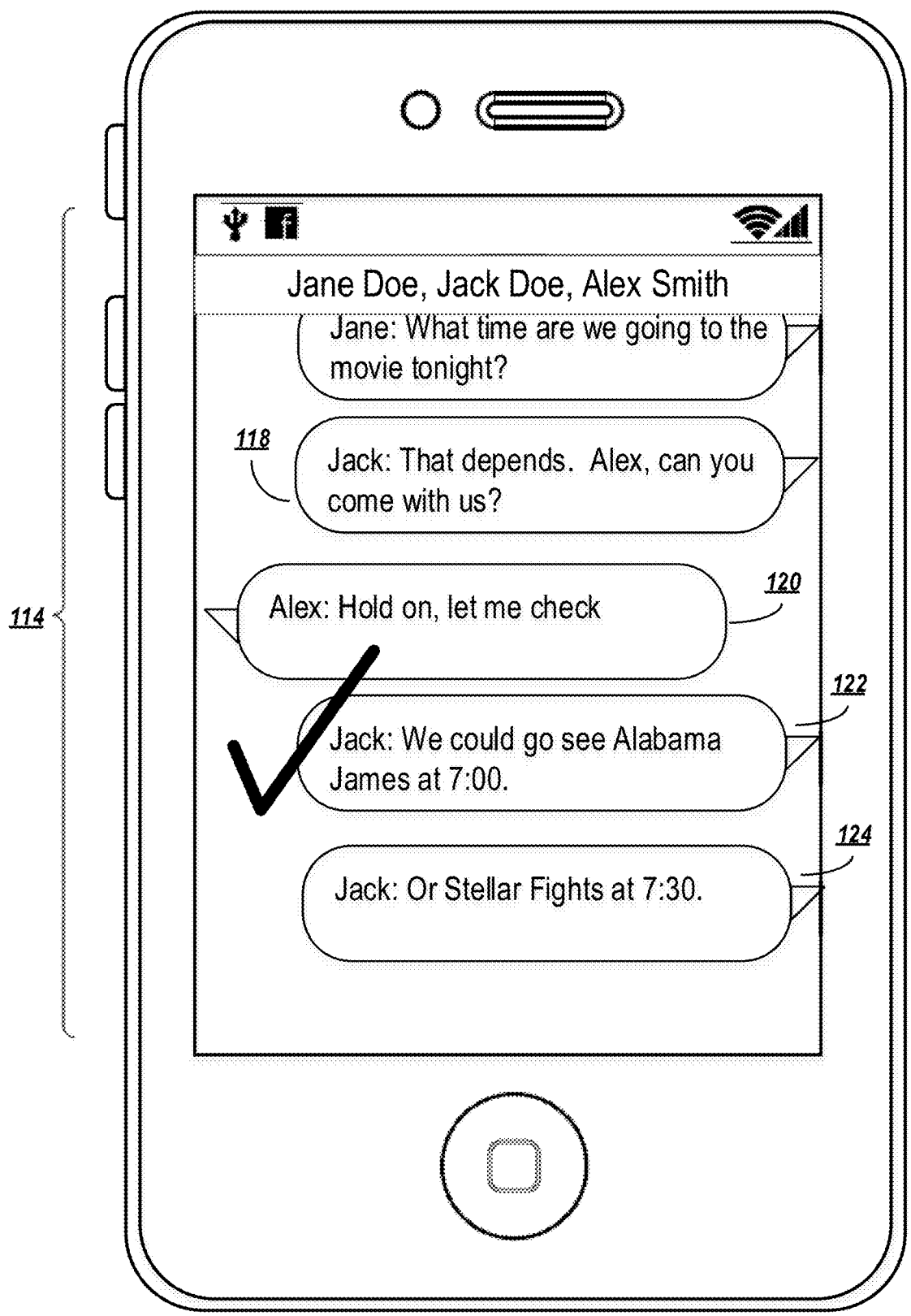
FIG. 1H depicts an example of the drawing of FIG. 1F as depicted on a receiving device where the messages in the conversation are moved to be displayed consistently on the sending device and the receiving device.

Another option is to move the messages of the conversation so that they appear consistent on each device. For example, FIG. 1H depicts the drawing of FIG. 1F as depicted on a receiving device (e.g., Jack's or Jane's) where the messages in the conversation are moved to be displayed consistently on the sending device (Alex's) and the receiving device. In other words, the interface 114 displays the messages in the same manner as in FIG. 1F. In some embodiments, the messages may initially be displayed as normal (with the sender on one side and other participants on the other side), and may then be rearranged when at least one drawing stroke is added to the conversation. In some cases, the messages may only be rearranged for consistency across devices if a drawing stroke is visible on the display. Accordingly, for instance, if the user scrolls the display so that a drawing stroke is no longer visible, the messages may be rearranged into the normal format.

Figure 1I:
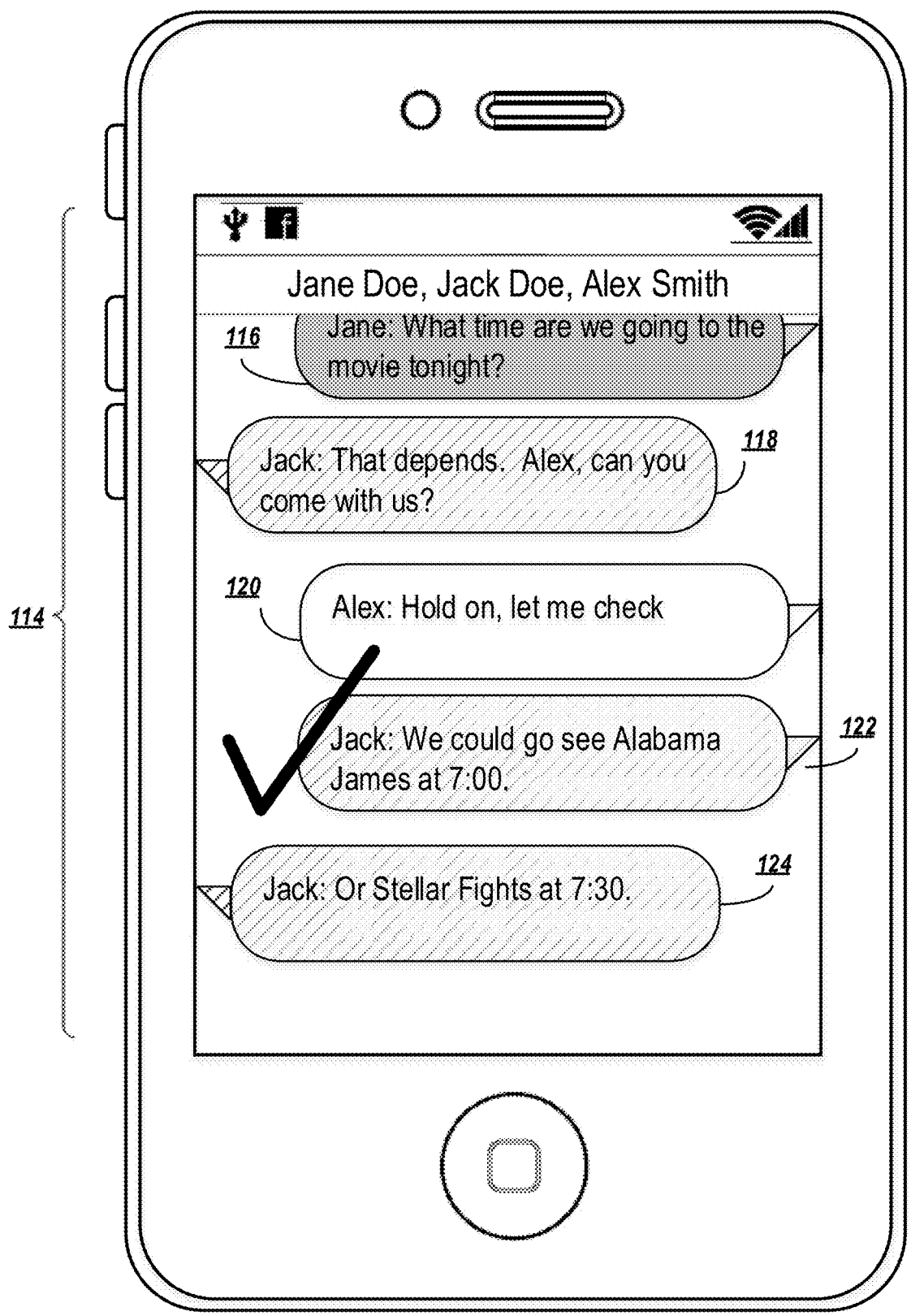
FIG. 1I depicts an example of the drawing of FIG. 1F as depicted on a receiving device where one of the messages in the conversation is moved to be displayed consistently on the sending device and the receiving device.

Another option, as depicted in FIG. 1I, is to allow a user to specify a reference message that the drawing stroke is defined in relation to. For example, if the first sustained contact (which causes the interface 114 to enter drawing mode) is primarily made on one of the messages, the selected message may be defined as the reference message. In the example depicted in FIGS. 1C-1D, the initial contact area 128 was made within a message 122. Accordingly, the message 122 may be defined as the reference message for the drawing including the strokes made while the initial contact is sustained. If the initial sustained contact is released and the user subsequently enters drawing mode again by sustaining contact on the same or a different message, that message may become the reference message for the drawing entered while the subsequent contact is sustained.

On the displays of the other recipients, all messages that are not defined as a reference message for a particular drawing may be displayed as normal (e.g., with the sender on one side, and all other conversation participants on the other side). However, reference messages may be displayed consistently across devices. Thus, the drawing may appear in the same position with respect to the reference message across different devices.

Because this may cause the reference message to change sides of the display, it may become less clear as to which messages originated with the sender and which originated with other participants. In order to alleviate confusion, messages may be assigned different colors depending on which user originated the messages. In some embodiments, two colors may be used (e.g., one for the sender, one for all other conversation participants). In the embodiment depicted in FIG. 1I, each of the conversation participants may be assigned a unique color.

Figure 1J:
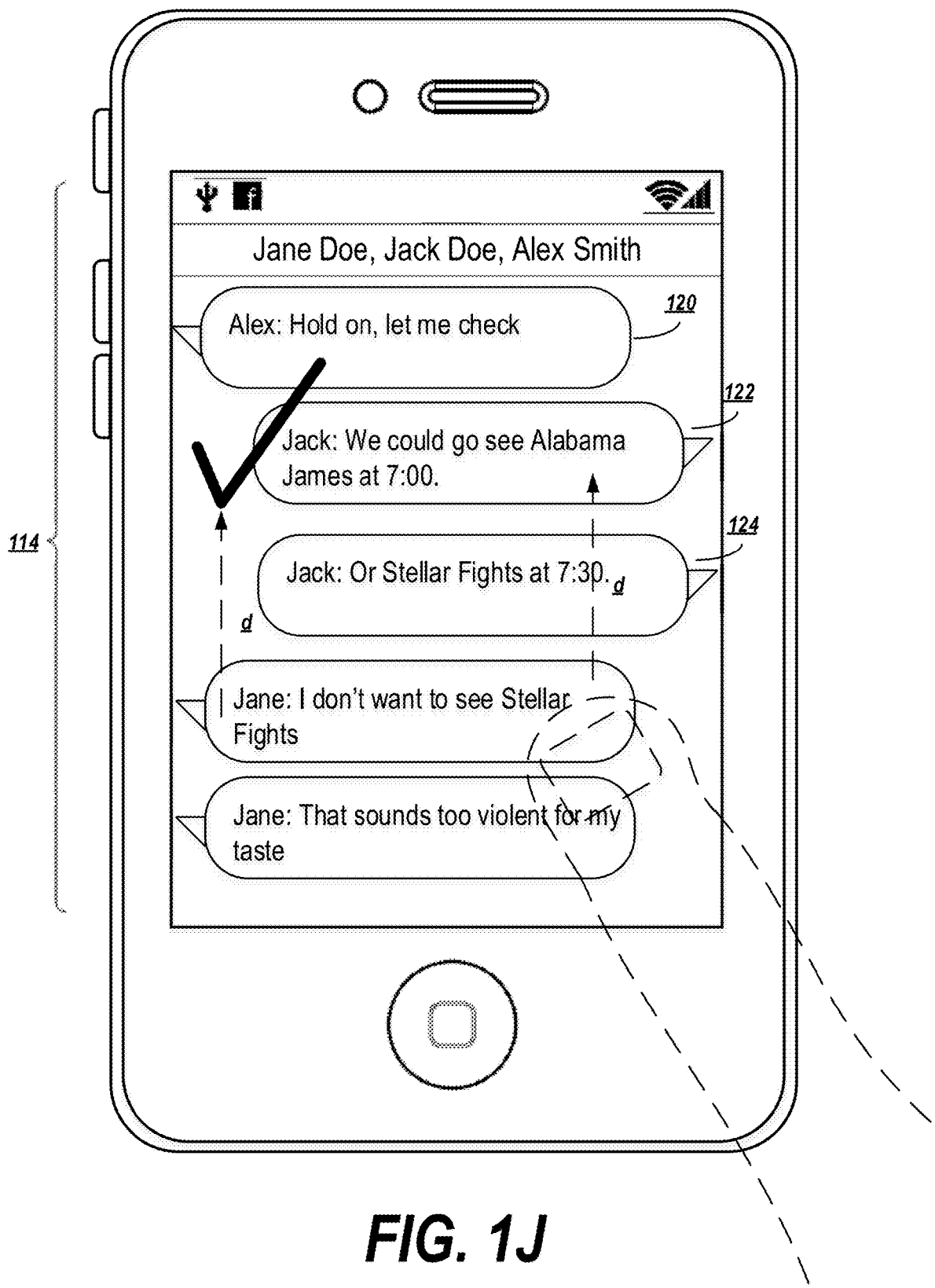
FIG. 1J depicts an example of the drawing of FIG. 1F after the user has scrolled through the conversation.

As the interface 114 is updated, the drawings may be automatically moved or eliminated. For instance, FIG. 1J depicts an example of the drawing of FIG. 1F after the user has scrolled through the conversation. In this case, the user may scroll the interface 114 upward by a distance d to reveal new messages. When the interface is scrolled, the location of the messages may change (by the distance d) with respect to the coordinate system defined by the messaging application (and/or the center of the coordinate system may be moved by the distance d). In order to maintain consistency between the messages and the drawings, the drawings may also be moved by the distance d in the same direction as the messages were scrolled.

Although FIG. 1J depicts a user scrolling vertically through a conversation, it may also be possible to scroll the conversation in a horizontal direction, or a combination of horizontally and vertically. In such cases, the drawings may be translated in the appropriate direction.

Next, an exemplary client/server system for supporting messaging drawing, and exemplary exchanges of information between the clients and servers are described with reference to FIGS. 2-3B.

Exemplary Client/Server System and Information Exchange

Figure 2:
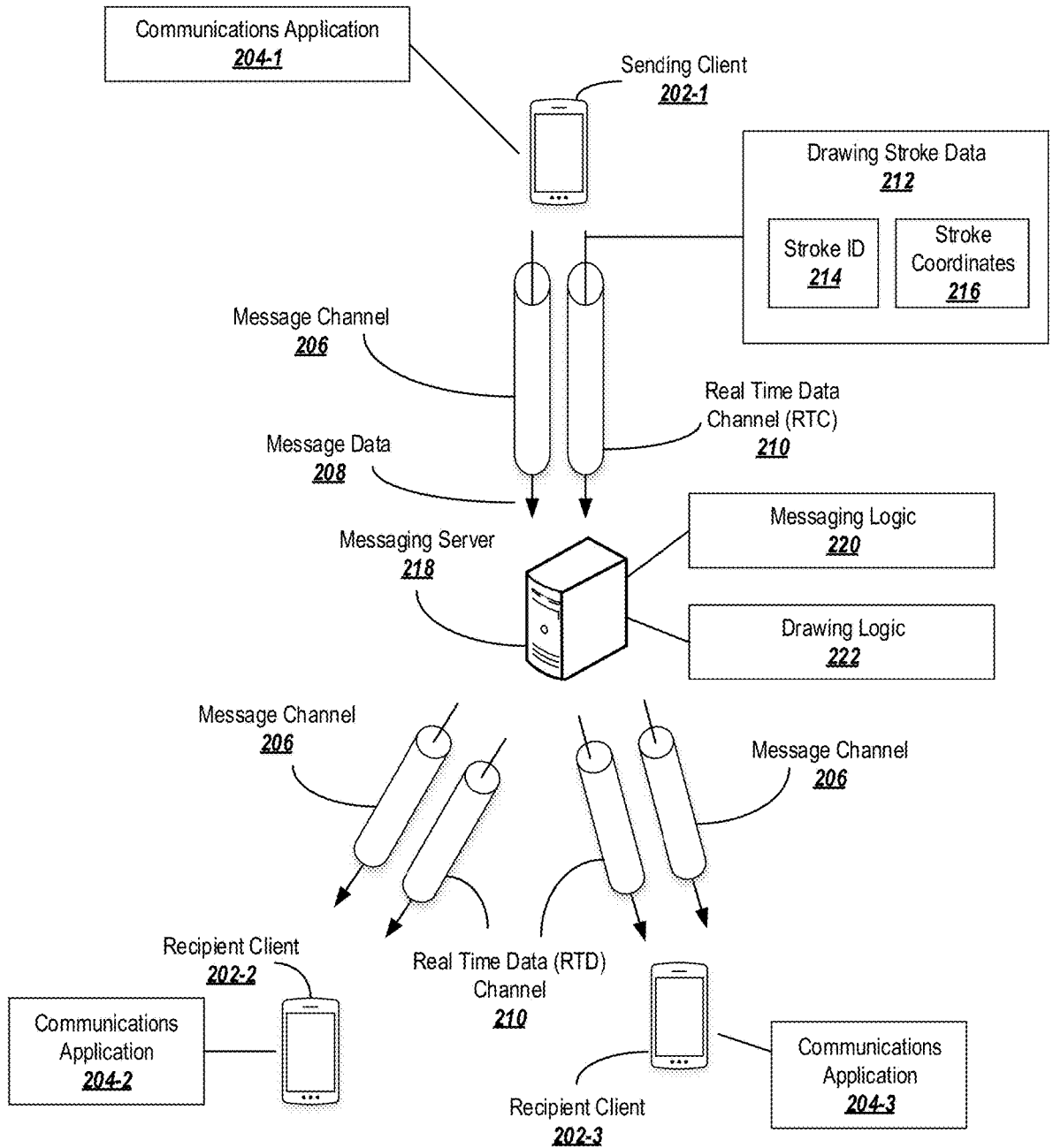
FIG. 2 depicts an exemplary system including clients and at least one server for processing messaging drawings.

FIG. 2 depicts an exemplary system including clients 202-$i$ and at least one server 218 for processing messaging drawings.

The clients 202-$i$ may be mobile devices, such as phones, tablets, etc., and may be equipped with touch-sensitive displays capable of registering haptic feedback. The clients 202-$i$ may be provided with respective communications applications 204-$i$, such as applications that allow the clients 202-$i$ to access the capabilities of a messaging service or other type of communications service (e.g., a live video broadcasting service, a video calling service, etc.).

The clients 202-$i$ may communicate with the server 218 through one or more channels. For example, a message channel 206 may carry message data pertaining to synchronous or asynchronous information transmitted from the communications application. The messages may be, for example, messages in a messaging service associated with a conversation through a thread ID.

A real time data channel (RTC) 210 may carry real-time data, including drawing stroke data 212. The drawing stroke data 212 may include an identifier 214 for a stroke, which may uniquely identify the stroke within the context of a conversation.

The stroke data 212 may further include stroke coordinates 216. The stroke coordinates may be, for example, a starting position and an ending position for the stroke, and may include intermediate coordinates and/or other information defining the location of the stroke within the coordinate system.

The stroke data 212 may also include other information, such as a reference message that the stroke is defined with respect to, a conversation (e.g., thread ID) to which the stroke belongs, etc. Another example of information that may be included in the stroke data 212 is a value for a property describing the stroke (e.g., stroke weight, stroke color, etc.). Furthermore, individual strokes defined while a first haptic contact is sustained may be assigned to a collection of strokes defining a drawing. The stroke data 212 may include an identifier that associates the stroke with a particular drawing.

The RTC 210 may also carry information about the coordinate system (e.g., synchronization information allowing the coordinate system to be defined in the same way on each client device).

A messaging server 218 may receive the message data 208 and the drawing stroke data 212, process the data, and forward it to appropriate recipients. For example, the messaging server 218 may retrieve a thread ID from a message 208 or drawing stroke data 212, determine a set of participants associated with the thread ID, and forward the data to the client devices 202-$i$ of the participants. To this end, the messaging server 218 may include messaging logic 220 for processing message data 208 and/or drawing logic 222 for processing drawing stroke data 212. At the receiving client side, each recipient client 202-$i$ may include a communications application 204-$i$ configured to process messages and drawing data and to display the messages and drawings on a communications viewer interface.

Alternatively, as described in more detail in connection with FIG. 5B below, a separate drawing server may be provided in communication with the message server 218. The drawing server may provide capabilities for processing drawings on behalf of the messaging service, and may thus include the drawing logic 222. For example, the RTC 210 may be received by the drawing server, whereas the message channel 206 may be received by the messaging server 218.

Figure 3A:
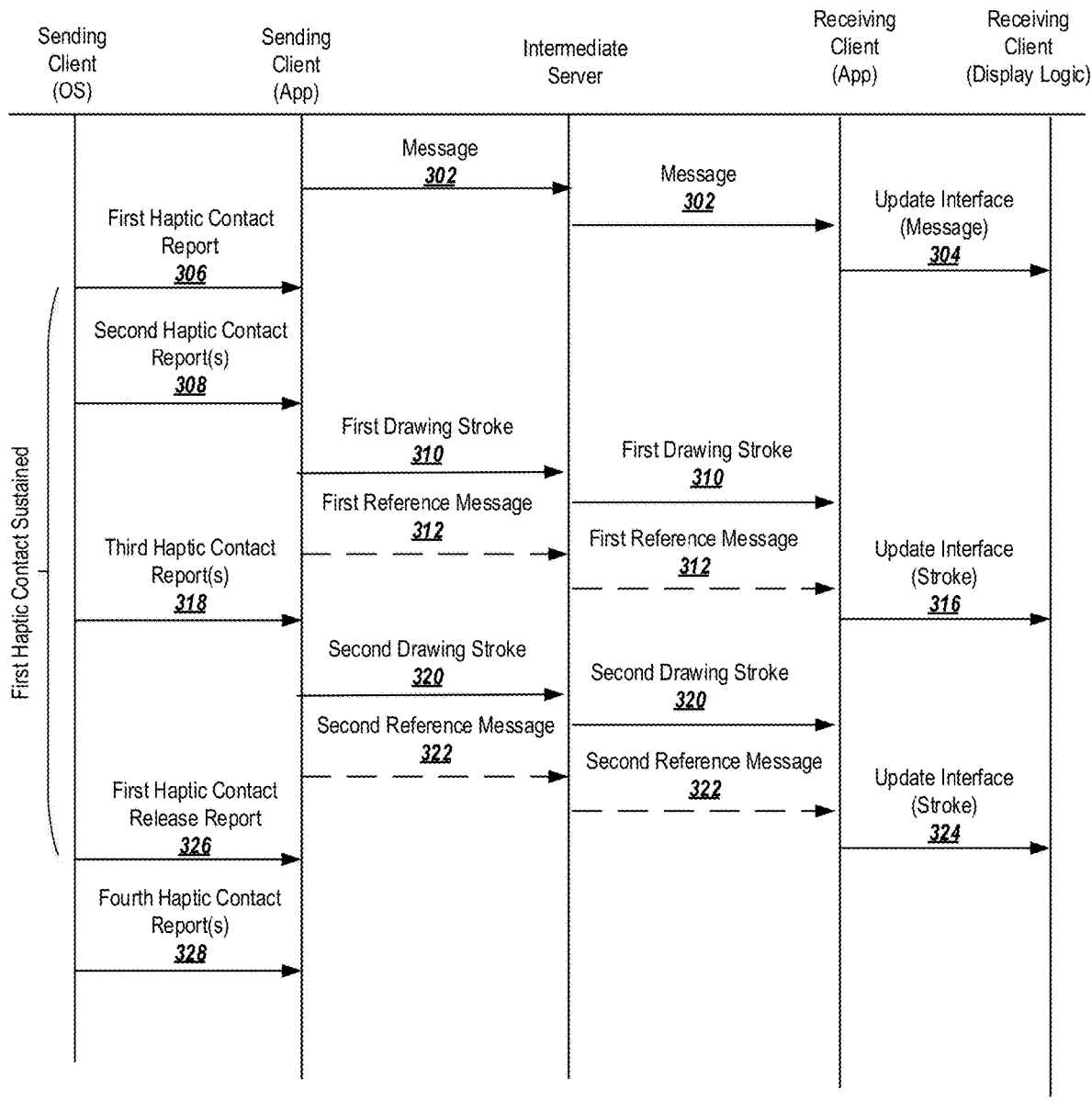
FIG. 3A is a flow diagram depicting an exemplary exchange of information in a communications system.
Figure 3B:
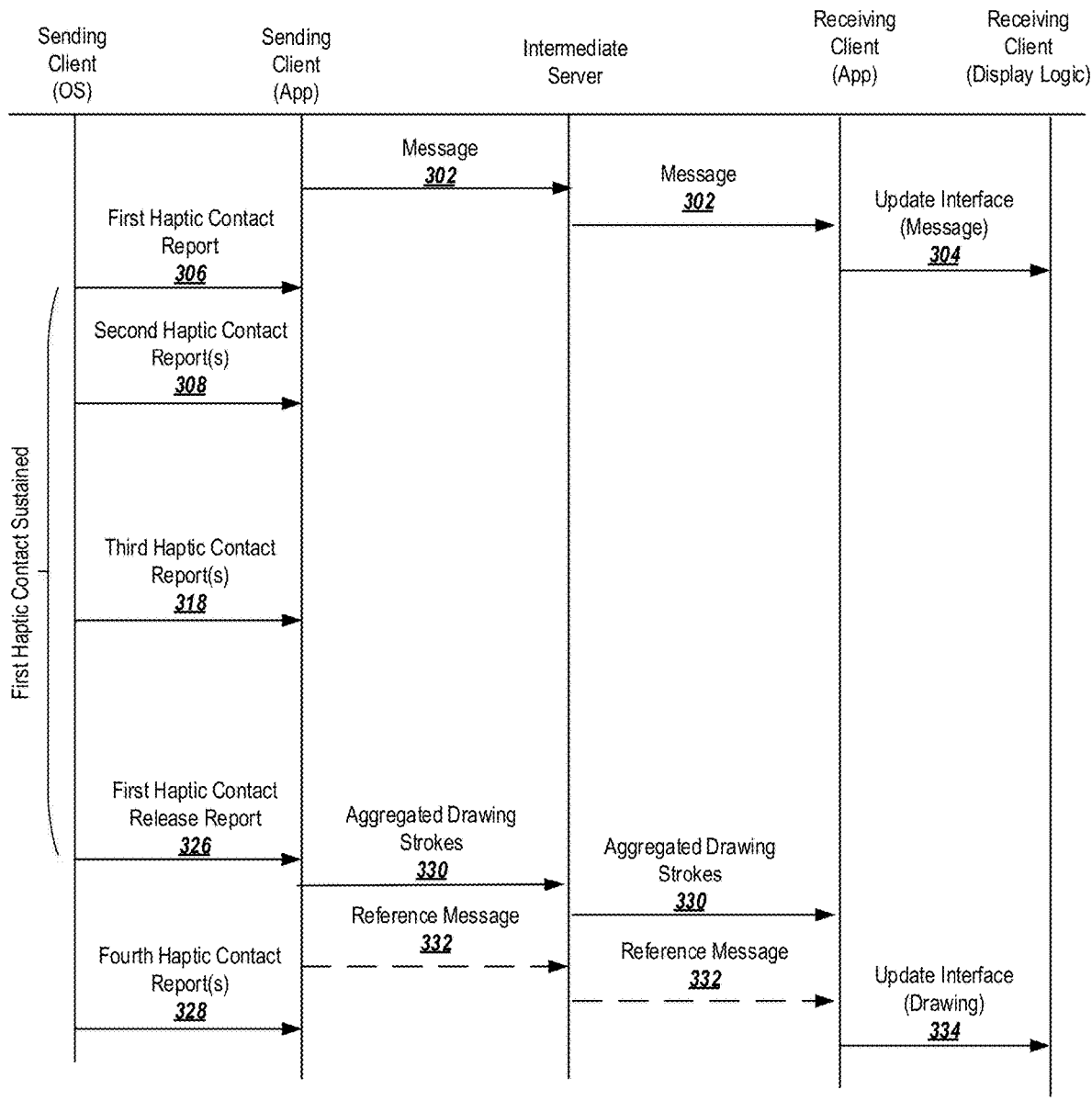
FIG. 3B is a flow diagram depicting an exemplary exchange of information in a communications system according to an alternative embodiment.

FIG. 3A is a flow diagram depicting an exemplary exchange of information in a communications system, such as the client/server system depicted in FIG. 2. A sending client may be provided with an operating system and a communication application operating under the operating system. A receiving client may include a corresponding communication application and display logic for updating a display of the device. An intermediate server may exchange information between the sending client and the receiving client.

The sending client (and/or receiving client) may exchange one or more messages 302 using the communication service. In this example, the sending client's communication application transmits a message 302 to the intermediate server, which is then forwarded to the receiving client. The receiving client's communication application may recognize the incoming information as a message and may instruct the display logic to update the interface to display the new message (potentially moving or removing other messages in the process to make room for the new message).

At some point (when zero or more messages have been transmitted in a conversation), the sending client OS may register a first haptic contact on a touch-sensitive display and may send a report 306 of the first haptic contact to the sending client's communication application. This initial report of haptic contact may include coordinates on the display at which the contact was initiated, which may be translated by the sending client application into a coordinate system defined with respect to the conversation displayed in the interface.

As indicated by the bracket along the left side of the flow diagram, the first haptic contact signal is sustained for a period of time. While the first haptic contact is sustained, the operating system may register a second haptic contact and may send a report 308 of the second haptic contact to the application. The second haptic contact report 308 may include information similar to that contained in the first haptic contact report 306.

The second haptic contact may be sustained for a certain period of time, during which the user may move their finger around the display. The movements while the second haptic contact is sustained may define a drawing stroke. The drawing stroke may be associated with a particular drawing that is defined while the first haptic contact is sustained.

When the user completes the drawing stroke, the user may release the second haptic contact, and a haptic contact release report may be transmitted to the application. Upon receiving the haptic contact release report, the system may generate drawing stroke data for the first stroke (as described above) and transmit the data for the first drawing stroke 310 to the intermediate server. Optionally, if the first haptic contact was registered on a particular message in the communication viewer interface, the application may further transmit an identification of the reference message 312 as part of, or separately from, the drawing stroke data 310.

The intermediate server may receive the drawing stroke 310 and/or reference message 312, and may identify the participants in the conversation to receive the drawing stroke. The drawing strokes 310 and/or reference message 312 may be transmitted to the receiving client(s) and delivered to the receiving clients' communication application. In response, the receiving client's application may instruct the display logic by issuing an instruction 316 to update the interface by drawing the first stroke.

Meanwhile, with the first haptic contact still sustained, the operating system may register a third haptic contact and release defining a further drawing stroke. In a manner similar to that described above, the operating system may send reports 318 of the haptic contact initiation and release, which may be translated into a drawing stroke 320 and optional reference message 322 by the application and transmitted to the intermediate server. The intermediate server may forward the information to the receiving client application, which may send an instruction 324 to the receiving client's display logic.

Subsequently, the first haptic contact (which caused the sending client application to enter drawing mode) may be released. Accordingly, the operating system of the sending client may generate a release report 326 for the first haptic contact and may forward the release report to the sending client's application. In response, the sending client's application may recognize that the first haptic contact has been released and may exit drawing mode.

Thus, when a fourth haptic contact is registered by the operating system, the fourth haptic contact may not register as a drawing stroke. Accordingly, a drawing stroke and reference message are not transmitted to the intermediate server in response to a report 328 of the fourth haptic contact.

If the fourth haptic contact is a sustained contact, the sending client application may register the fourth contact as an instruction to enter drawing mode again, and further haptic contacts may generate additional drawing strokes.

In the embodiment depicted in FIG. 3A, drawing strokes are transmitted in real time as they are completed. As an alternative, the system may aggregate drawing strokes as they are created and, when drawing mode is exited by releasing the first haptic contact, may batch transmit the drawing strokes as a drawing. An example of such an embodiment is depicted in the flow diagram of FIG. 3B.

This example proceeds in a similar manner to FIG. 3A, except that as each haptic contact corresponding to a drawing stroke is reported to the sending client application, the application makes note of the drawing stroke but does not immediately transmit the individual strokes to the intermediate server. The stroke data may instead be stored in a buffer for later transmission.

Upon receiving the first haptic contact release report 326, the system may retrieve the strokes stored in the buffer, and transmit the aggregated drawing strokes 330 (with or without an associated reference message 332) to the intermediate server. The intermediate server may identify conversation participants as above, and may transmit the aggregated drawing strokes 330 and/or reference message 332 to the participants. Upon receiving the strokes and/or reference message at the receiving client application, the receiving client application may issue an instruction 334 to the display logic to draw the complete drawing on the interface.

The embodiments described above may be implemented in suitable logic stored on a non-transitory computer-readable medium. Examples of such logic are next described with reference to FIGS. 4A-4C.

Exemplary Logic

Figure 4A:
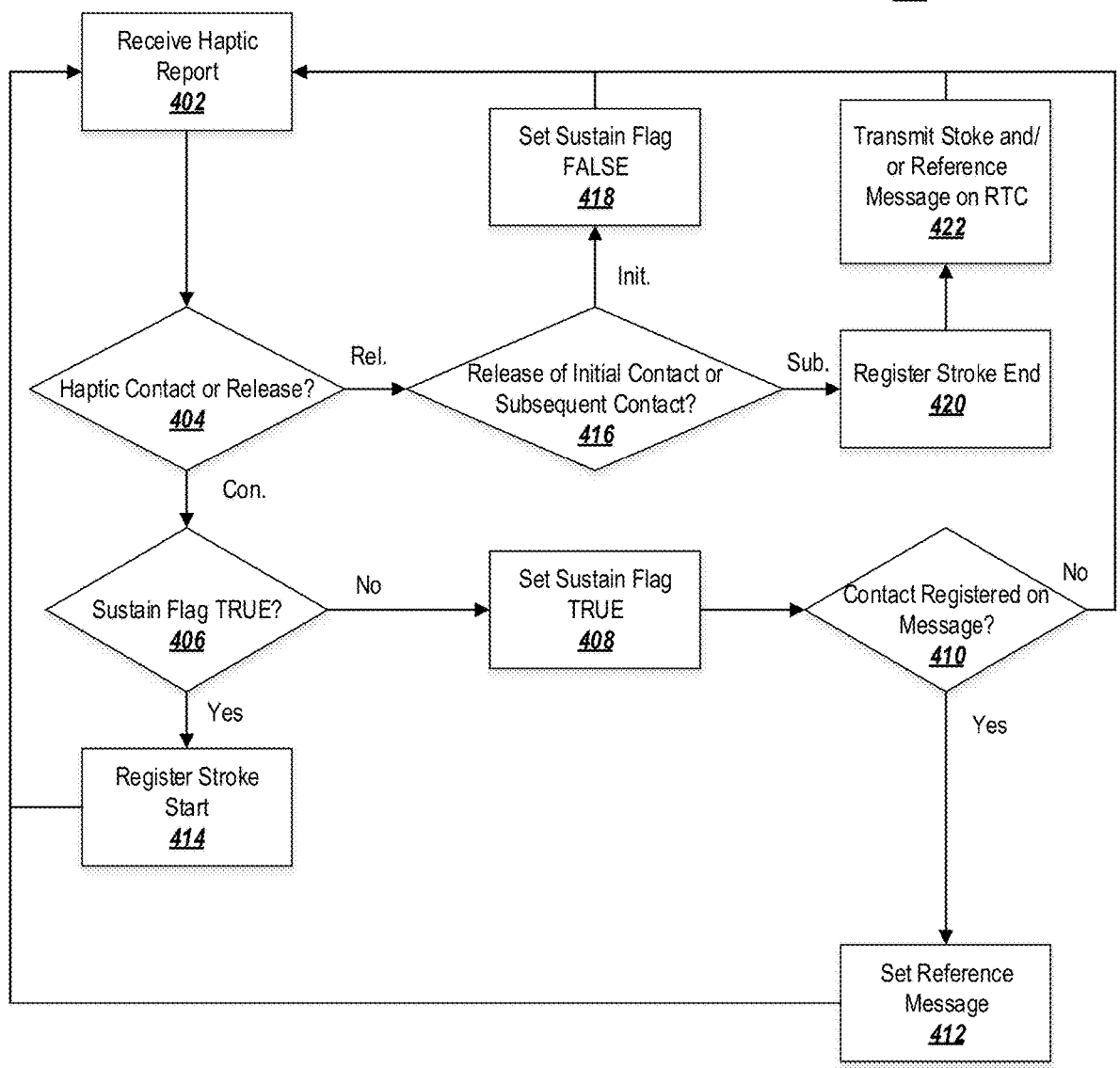
FIG. 4A depicts exemplary sending-client side logic configured to add drawings to a conversation.

FIG. 4A depicts exemplary logic 400 implemented on a system, such as sending client mobile device, configured to add drawings to a conversation carried out through a communication application.

At block 402, the system may receive a report relating to a haptic contact. The report may be generated by an operating system of the device, with which the logic may register to receive haptic contact reports. The report may include coordinates, such as X/Y coordinates, relating to the contact. The system may translate the X/Y coordinates into coordinates in a coordinate system for the communication application.

At block 404, the system may determine whether the report received at block 402 was a report of a haptic contact initiation or a haptic contact release. The report may indicate what type of haptic contact (initiation or release) has been registered. Alternatively, a first report having a particular identifier may be understood as a contact initiation, while a second report having the same identifier may be understood as a contact release.

If the report was a report of a haptic contact initiation, then at block 406, the system may determine whether a sustain flag is set to "true." The sustain flag may represent a flag that indicates whether a haptic contact is being sustained, thus causing the system to be in a drawing mode.

If the determination at block 406 is "no" (i.e., haptic contact is not currently being sustained), then at block 408 the system may set the sustain flag to "true," indicating that the contact is being sustained and that the system should enter drawing mode. The haptic signal that caused the system to enter drawing mode may be flagged as an initial contact. In some embodiments, entering drawing mode may cause the interface to change (e.g., to visually indicate that drawing mode has been entered and/or to provide editing tools, such as stroke property tools).

In some embodiments, sustaining haptic contact may be used both to enter drawing mode and to scroll the display. For example, while the initial contact is sustained, the user may continue to hold one finger to the display and move that finger to cause the interface to move in a corresponding direction. If the user places a second finger on the display, this may be registered as the start of a drawing stroke in drawing mode. Optionally, the interface may be locked against scrolling while the drawing stroke is being drawn.

At block 410, the system may determine whether the contact was registered on a message in a communication viewer interface. For example, the system may determine whether the coordinates in the coordinate system (from block 402) correspond to the location of a message. If not, processing may return to block 402 and the system may await the next haptic contact report. If so, processing may proceed to block 412 and the selected message may be set as the reference message for subsequent drawing strokes. Processing may then return to block 402.

On the other hand, if the determination at block 406 is "yes" (i.e., the sustain flag has been set to "true," indicating that drawing mode has been previously entered), then at block 414, the system may register a start of a drawing stroke. The drawing stroke may be assigned an identifier, and the coordinates in the coordinate system (as determined at block 402) may be stored as the start of the drawing stroke. The haptic contact that started the drawing stroke may be registered as a subsequent contact. Processing may then return to block 402.

Returning to block 404, if the haptic contact report was a report of a haptic contact release, then at block 416 the system may determine whether the contact that was released was an initial contact or a subsequent contact (as flagged in block 408 or block 414). If the contact was an initial contact (e.g., the contact caused the system to enter drawing mode), then at block 418 the system may set the sustain flag to false and exit drawing mode. Processing may then return to block 402.

On the other hand, if the released contact was a subsequent contact (e.g., a contact that causes a drawing stroke to be started), then at block 420 the system may register an end of the stroke that was begun in block 414. The system may retrieve the coordinates as determined in block 402, and use the coordinates to define an end of the stroke. At block 422, the system may transmit the stroke information and/or any reference message associated with the stroke on the RTC to an intermediate server. Processing may then return to block 402.

Figure 4B:
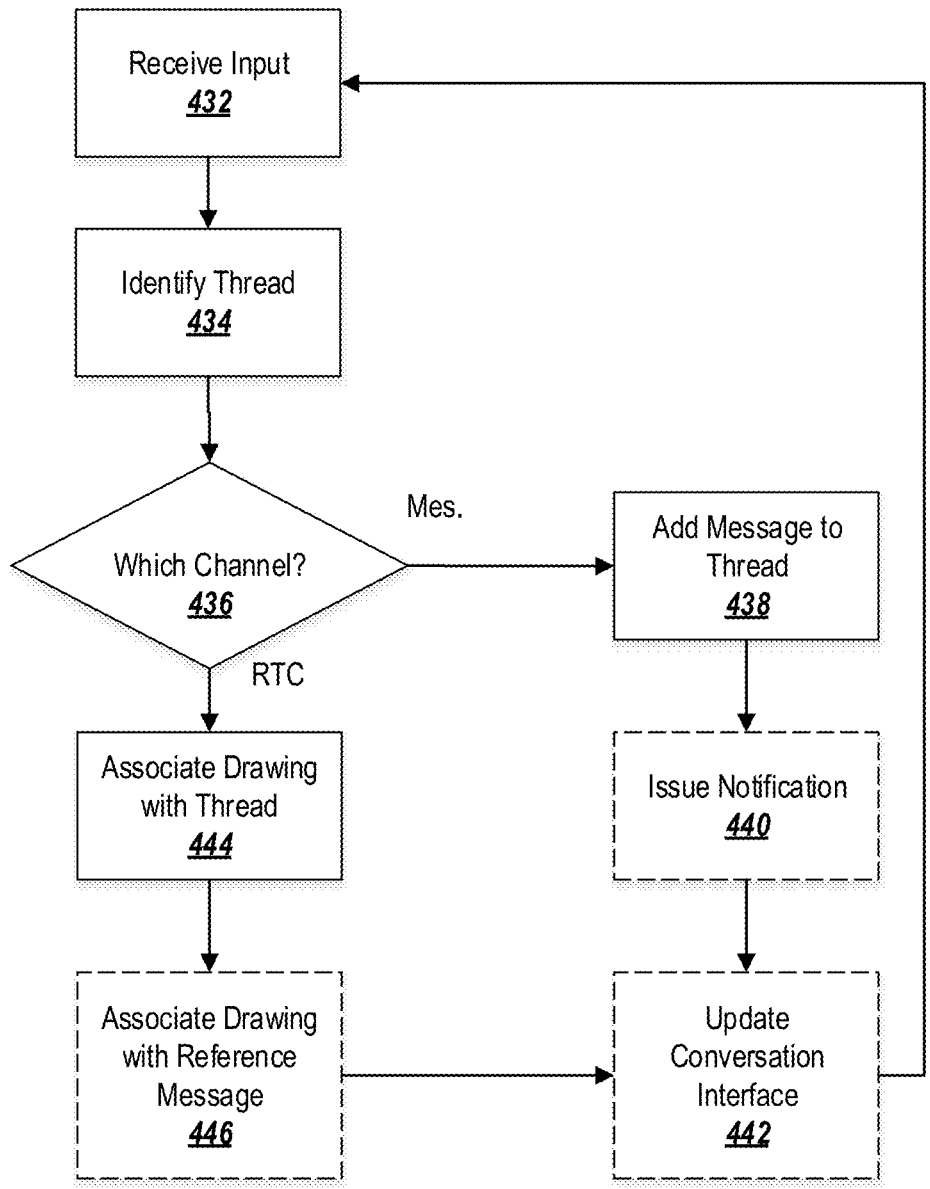
FIGS. 4B-4C depicts exemplary receiving-client side logic configured to process received drawings and display the received drawings in connection with a conversation, respectively.

FIG. 4B depicts exemplary logic 430 performed by a system (such as a receiving client) configured to process received drawings in connection with a conversation.

At block 432, the system may receive an input relating to a communication application. The input may be associated with a thread identifier indicating which conversation associated with the communication service the input is in reference to. Accordingly, at block 434, the system may retrieve the thread ID and identify the associated conversation.

At block 436, the system may determine which channel the input was received on. If the input was received on a messaging channel, then at block 438 the system may add the message to the thread identified in block 434. The system may optionally issue a notification of new message receipt, if the system is configured to offer such notifications. Optionally, if the conversation is currently being viewed on the system, then the system may update the conversation viewer interface to display the new message. Processing may then return to block 432 to await new input.

On the other hand, if the input was received on a real time data channel (block 436), then it may be determined that the input is stroke data relating to a drawing. Accordingly, at block 444 the system may associate the stroke data with the thread identified at block 434. Optionally, if a reference message is specified for the drawing, then at block 446, the system may associate the stroke data with the reference message.

Processing may then proceed to block 442. If the conversation relating to the stroke data is currently displayed in a conversation viewer interface, the interface may be updated. Depending on the implementation and/or preferences set at the system, the system may optionally rearrange the messages of the conversation according to one of the methods described above. Processing may then return to block 432.

Figure 4C:
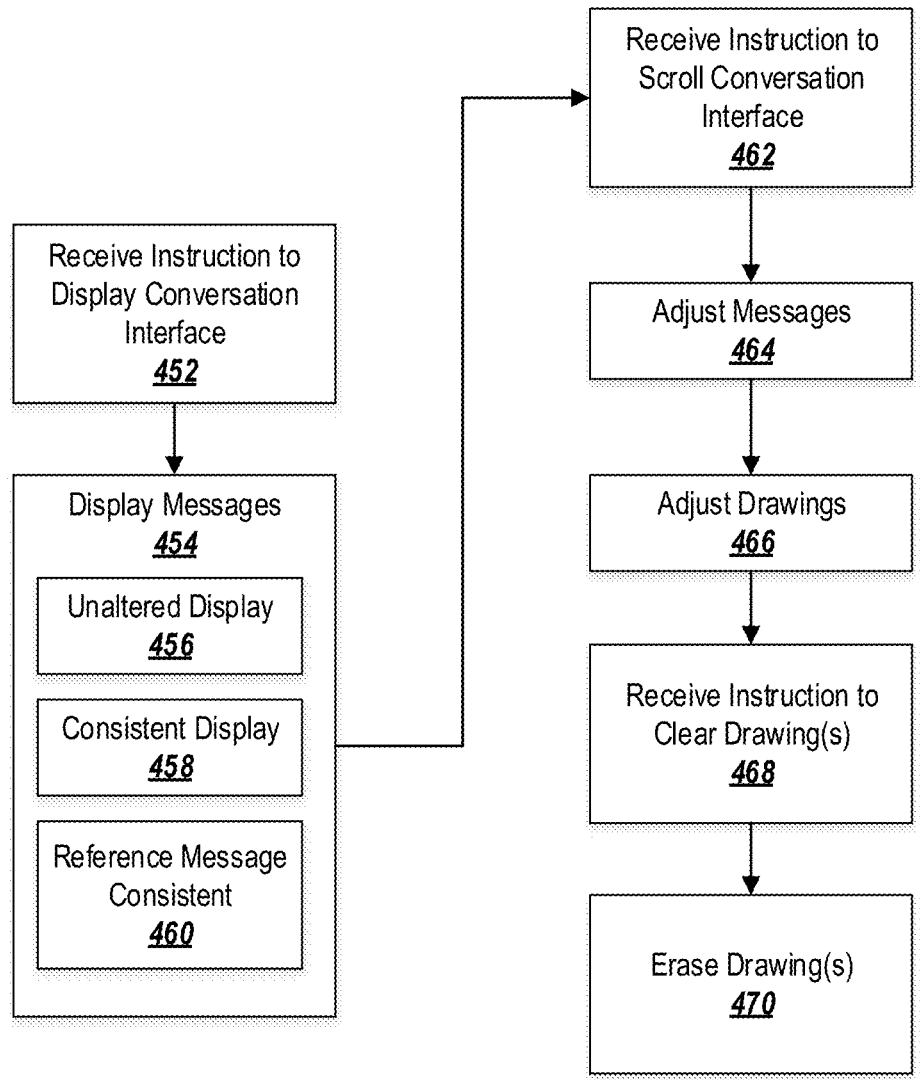

FIG. 4C depicts exemplary client logic 450 configured to update a display of a conversation including a drawing. The logic 450 may be performed by a sending client or a receiving client, as appropriate.

At block 452, the system may receive an instruction to display a conversation viewer interface. For example, the instruction may be received as a result of selecting a particular conversation thread in the communication interface (FIG. 1A), by receiving a selection of a notification relating to the conversation, etc.

At block 454, the system may display the messages in the conversation according to one of several methods described herein. For example, the system may select: an unaltered display option 456, as depicted in FIG. 1G; a consistent display option 458, as depicted in FIG. 1H; or a display option 460 in which the reference message is displayed consistently across devices, but the rest of the display is unaltered, as depicted in FIG. 1I. Other options are also possible. The option used may be set by the system, or may be user-alterable (e.g., through a preferences or settings menu).

At block 462, the system may receive an instruction to scroll the conversation interface. For example, the user may make initial sustained contact with the display and move their finger to scroll the interface in a corresponding direction. Upon registering a scrolling instruction, the system may, at block 464, adjust the messages according to the direction and amount scrolled.

The system may update the message positions with respect to the coordinate system of the communication application, or may allow the coordinate system to move with the messages. The positions of any drawings associated with the messages may also be updated at block 466. If the system updated the message positions while holding the coordinate system constant, the system may apply a translation factor to the drawings at block 466 to move the messages to new positions based on the amount and direction of scrolling. If the coordinate system was moved with the messages, then at block 466 the system need not recalculate new positions for the drawings; the system may simply draw the drawings on the updated coordinate system using the original coordinates.

At block 468, the system may receive in instruction to clear one or more of the drawings (as described above). Accordingly, at block 470, the system may erase the drawings, either from all conversation participants' interfaces, or only from the interface of the participant that cleared the drawing.

Figure 5A:
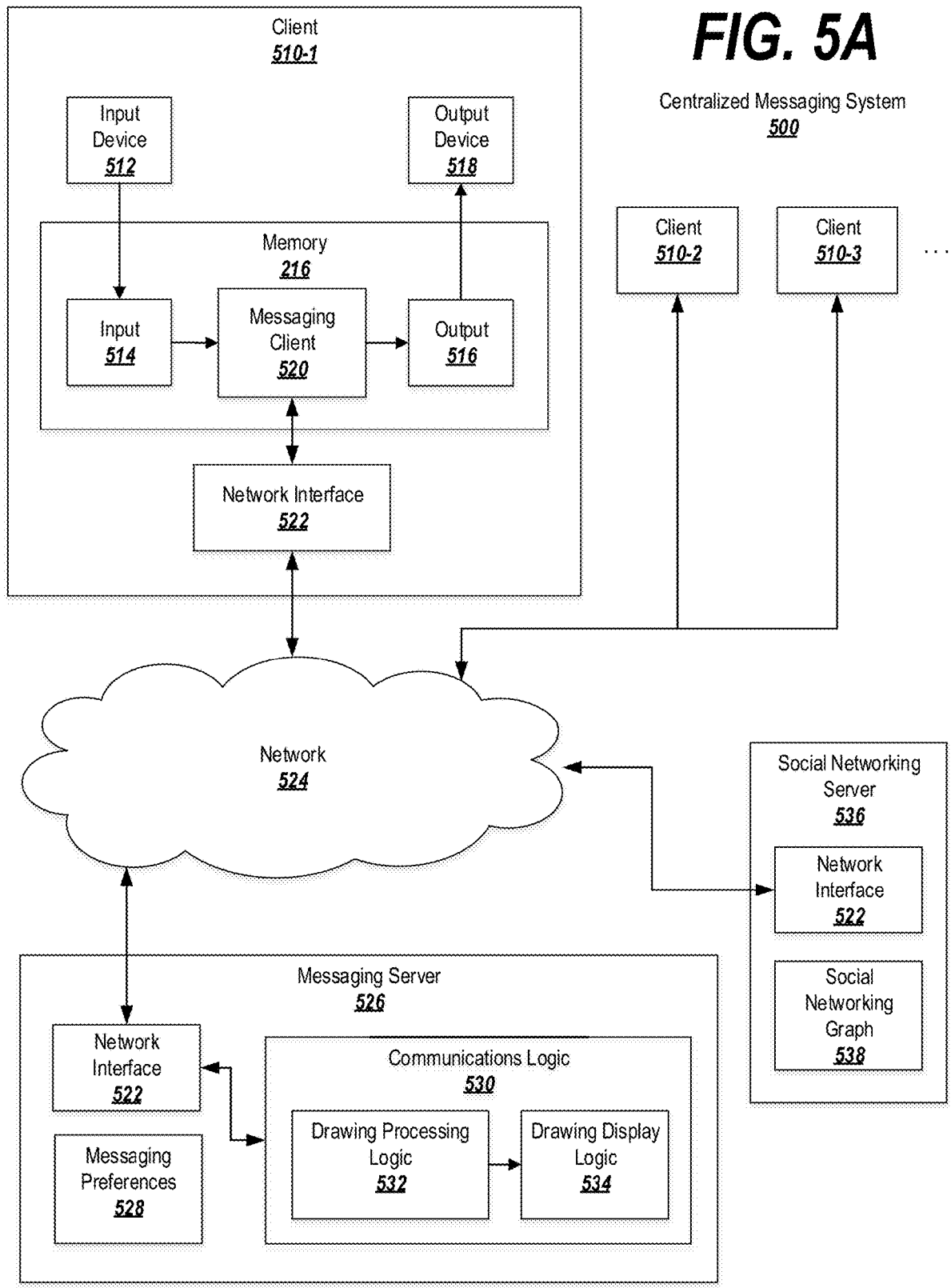
FIG. 5A is a block diagram providing an overview of a system including an exemplary centralized messaging service.
Figure 5C:
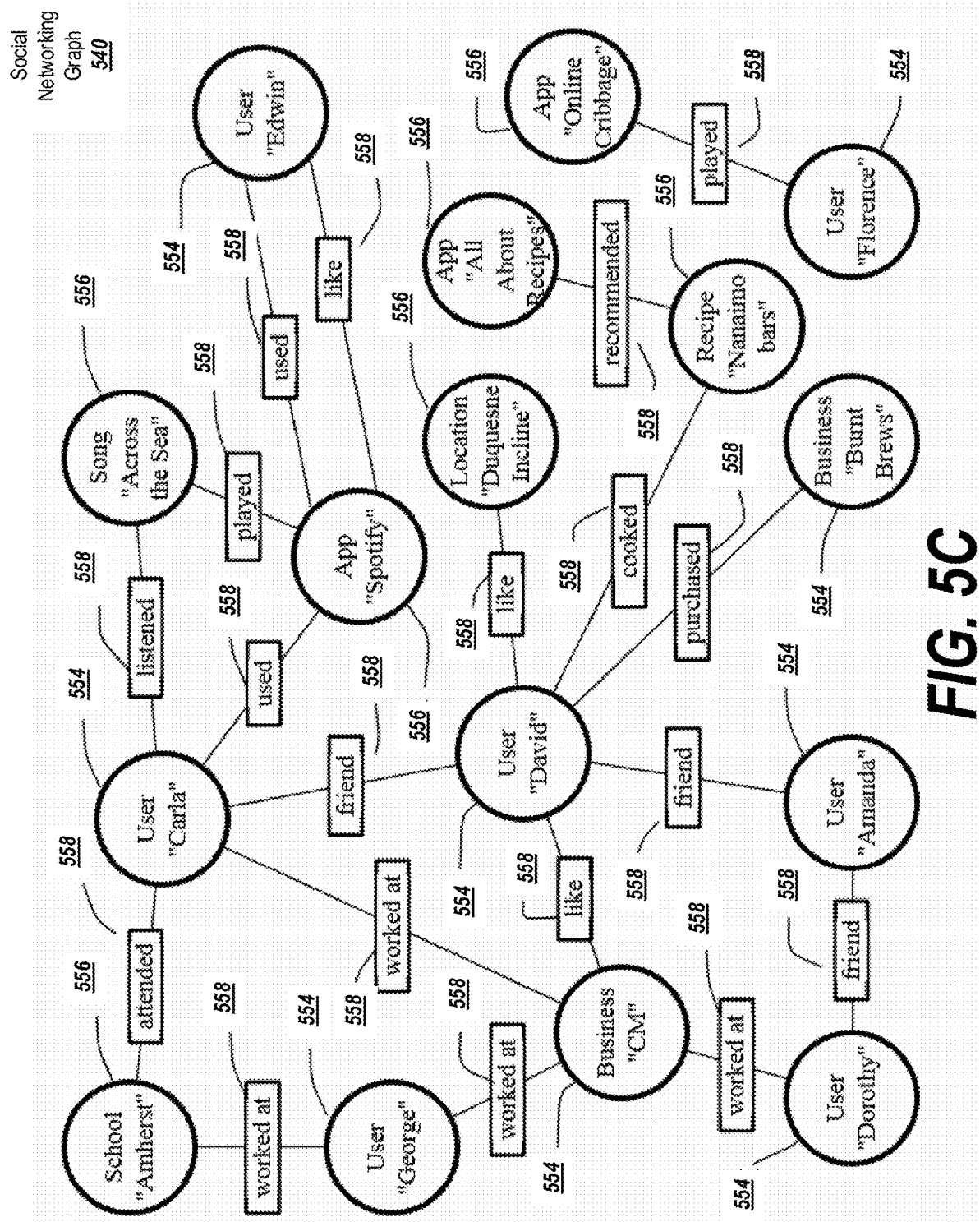
FIG. 5C depicts the social networking graph of FIGS. 5A-5B in more detail.

These examples may be implemented by a messaging system that is provided either locally, at a client device, or remotely (e.g., at a remote server). FIGS. 5A-5C depict various examples of messaging systems, and are discussed in more detail below.

Messaging System Overview

FIG. 5A depicts an exemplary centralized messaging system 500, in which functionality for organizing messages asynchronously and/or using threads is integrated into a messaging server. The centralized system 500 may implement some or all of the structure and/or operations of a messaging service in a single computing entity, such as entirely within a single centralized server device 526.

The messaging system 500 may include a computer-implemented system having software applications that include one or more components. Although the messaging system 500 shown in FIG. 5A has a limited number of elements in a certain topology, the messaging system 500 may include more or fewer elements in alternate topologies.

A messaging service 500 may be generally arranged to receive, store, and deliver messages. The messaging service 500 may store messages while messaging clients 520, such as may execute on client devices 510, are offline and deliver the messages once the messaging clients are available.

A client device 510 may transmit messages addressed to a recipient user, user account, or other identifier resolving to a receiving client device 510. In exemplary embodiments, each of the client devices 510 and their respective messaging clients 520 are associated with a particular user or users of the messaging service 500. In some embodiments, the client devices 510 may be cellular devices such as smartphones and may be identified to the messaging service 500 based on a phone number associated with each of the client devices 510. In some embodiments, each messaging client may be associated with a user account registered with the messaging service 500. In general, each messaging client may be addressed through various techniques for the reception of messages. While in some embodiments the client devices 510 may be cellular devices, in other embodiments one or more of the client devices 510 may be personal computers, tablet devices, any other form of computing device.

The client 510 may include one or more input devices 512 and one or more output devices 518. The input devices 512 may include, for example, microphones, keyboards, cameras, electronic pens, touch screens, and other devices for receiving inputs including message data, requests, commands, user interface interactions, selections, and other types of input. The output devices 518 may include a speaker, a display device such as a monitor or touch screen, and other devices for presenting an interface to the messaging system 500.

The client 510 may include a memory 519, which may be a non-transitory computer readable storage medium, such as one or a combination of a hard drive, solid state drive, flash storage, read only memory, or random access memory. The memory 519 may a representation of an input 514 and/or a representation of an output 516, as well as one or more applications. For example, the memory 519 may store a messaging client 520 and/or a social networking client that allows a user to interact with a social networking service.

The input 514 may be textual, such as in the case where the input device 212 is a keyboard. Alternatively, the input 514 may be an audio recording, such as in the case where the input device 512 is a microphone. Accordingly, the input 514 may be subjected to automatic speech recognition (ASR) logic in order to transform the audio recording to text that is processable by the messaging system 500. The ASR logic may be located at the client device 510 (so that the audio recording is processed locally by the client 510 and corresponding text is transmitted to the messaging server 526), or may be located remotely at the messaging server 526 (in which case, the audio recording may be transmitted to the messaging server 526 and the messaging server 526 may process the audio into text). Other combinations are also possible—for example, if the input device 512 is a touch pad or electronic pen, the input 514 may be in the form of handwriting, which may be subjected to handwriting or optical character recognition analysis logic in order to transform the input 512 into processable text.

The client 510 may be provided with a network interface 522 for communicating with a network 524, such as the Internet. The network interface 522 may transmit the input 512 in a format and/or using a protocol compatible with the network 524 and may receive a corresponding output 516 from the network 524.

The network interface 522 may communicate through the network 524 to a messaging server 526. The messaging server 526 may be operative to receive, store, and forward messages between messaging clients.

The messaging server 526 may include a network interface 522, messaging preferences 528, and communications logic 530. The messaging preferences 528 may include one or more privacy settings or other preferences for one or more users and/or message threads. Furthermore, the messaging preferences 528 may include one or more settings, including default settings, for the logic described herein.

The communications logic 530 may include drawing processing logic 532 that is operable to create and transmit drawing strokes. The message threading component 530 may further include drawing display logic 534 that is operable to update a display of a communications application.

The network interface 522 of the client 510 and/or the messaging server 526 may, also be used to communicate through the network 524 with a social networking server 536. The social networking server 536 may include or may interact with a social networking graph 538 that defines connections in a social network. Furthermore, the messaging server 526 may connect to the social networking server 536 for various purposes, such as retrieving connection information, messaging history, event details, etc. from the social network.

A user of the client 510 may be an individual (human user), an entity (e.g., an enterprise, business, or third-party application), or a group (e.g., of individuals or entities) that interacts or communicates with or over the social networking server 536. The social-networking server 536 may be a network-addressable computing system hosting an online social network. The social networking server 536 may generate, store, receive, and send social-networking data, such as, for example, user-profile data, concept-profile data, social-graph information, or other suitable data related to the online social network. The social networking server 536 may be accessed by the other components of the network environment either directly or via the network 524.

The social networking server 536 may include an authorization server (or other suitable component(s)) that allows users to opt in to or opt out of having their actions logged by social-networking server 536 or shared with other systems (e.g., third-party systems, such as the messaging server 526), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 536 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 538. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 536 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 536 may send a request to the data store for the object. The request may identify the user associated with the request. The requested data object may only be sent to the user (or a client system 510 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 536 or explicit connections of a user to a node, object, entity, brand, or page on social networking server 536. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 5A may be well-suited to deployment as a new system or as an upgrade to an existing system, because the logic for pivoting to a group conversation (e.g., the logic of the intent determination component 532 and/or the logic of the group selection component 534) are incorporated into the messaging server 526. In contrast, FIG. 5B depicts an exemplary distributed messaging system 550, in which functionality for in which functionality for creating, transmitting, and displaying messaging drawings is distributed and remotely accessible from the messaging server. Examples of a distributed system 550 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 5B are identical to those in FIG. 5A, and a description of these elements is not repeated here for the sake of brevity. The primary difference between the centralized embodiment and the distributed embodiment is the addition of a separate drawing server 552, which hosts the drawing processing logic 532 and the drawing display logic 534. The drawing server 552 may be distinct from the messaging server 526 but may communicate with the messaging server 526, either directly or through the network 524, to provide the functionality of the drawing processing logic 532 and the drawing display logic 534 to the messaging server 526.

The embodiment depicted in FIG. 5B may be particularly well suited to allow exemplary embodiments to be deployed alongside existing messaging systems, for example when it is difficult or undesirable to replace an existing messaging server. Additionally, in some cases the messaging server 526 may have limited resources (e.g. processing or memory resources) that limit or preclude the addition of the additional pivot functionality. In such situations, the capabilities described herein may still be provided through the separate drawing server 552.

In still further embodiments, the drawing processing logic 532 and the drawing display logic 534 may be provided locally at the client 510-$i$, for example as part of the messaging client 520. In these embodiments, each client 510-$i$ makes its own determination as to which messages belong to which thread, and how to update the display and issue notifications. As a result, different clients 510-$i$ may display the same conversation differently, depending on local settings (for example, the same messages may be assigned to different threads, or similar threads may have different parents or highlights).

FIG. 5C illustrates an example of a social networking graph 538. In exemplary embodiments, a social networking service may store one or more social graphs 538 in one or more data stores as a social graph data structure via the social networking service.

The social graph 538 may include multiple nodes, such as user nodes 554 and concept nodes 556. The social graph 228 may furthermore include edges 558 connecting the nodes. The nodes and edges of social graph 228 may be stored as data objects, for example, in a data store (such as a social-graph database). Such a data store may include one or more searchable or queryable indexes of nodes or edges of social graph 228.

The social graph 538 may be accessed by a social-networking server 226, client system 210, third-party system (e.g., the translation server 224), or any other approved system or device for suitable applications.

A user node 554 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 554 corresponding to the user, and store the user node 30 in one or more data stores. Users and user nodes 554 described herein may, where appropriate, refer to registered users and user nodes 554 associated with registered users. In addition or as an alternative, users and user nodes 554 described herein may, where appropriate, refer to users that have not registered with the social-networking system. In particular embodiments, a user node 554 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 554 may be associated with one or more data objects corresponding to information associated with a user. In particular embodiments, a user node 554 may correspond to one or more webpages. A user node 554 may be associated with a unique user identifier for the user in the social-networking system.

In particular embodiments, a concept node 556 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 556 may be associated with one or more data objects corresponding to information associated with concept node 556. In particular embodiments, a concept node 556 may correspond to one or more webpages.

In particular embodiments, a node in social graph 538 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 556. Profile pages may be viewable by all or a selected subset of other users. As an example and not by way of limitation, a user node 554 may have a corresponding user-profile page in which the corresponding user may add content, make declarations, or otherwise express himself or herself. A business page such as business page 205 may comprise a user-profile page for a commerce entity. As another example and not by way of limitation, a concept node 556 may have a corresponding concept-profile page in which one or more users may add content, make declarations, or express themselves, particularly in relation to the concept corresponding to concept node 556.

In particular embodiments, a concept node 556 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 554 corresponding to the user and a concept node 556 corresponding to the third-party webpage or resource and store edge 558 in one or more data stores.

In particular embodiments, a pair of nodes in social graph 538 may be connected to each other by one or more edges 558. An edge 558 connecting a pair of nodes may represent a relationship between the pair of nodes. In particular embodiments, an edge 558 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 558 connecting the first user's user node 554 to the second user's user node 554 in social graph 538 and store edge 558 as social-graph information in one or more data stores. In the example of FIG. 5C, social graph 538 includes an edge 558 indicating a friend relation between user nodes 554 of user "Amanda" and user "Dorothy." Although this disclosure describes or illustrates particular edges 558 with particular attributes connecting particular user nodes 554, this disclosure contemplates any suitable edges 558 with any suitable attributes connecting user nodes 554. As an example and not by way of limitation, an edge 558 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 538 by one or more edges 558.

In particular embodiments, an edge 558 between a user node 554 and a concept node 556 may represent a particular action or activity performed by a user associated with user node 554 toward a concept associated with a concept node 556. As an example and not by way of limitation, as illustrated in FIG. 5C, a user may "like," "attended," "played," "listened," "cooked," "worked at," or "watched" a concept, each of which may correspond to a edge type or subtype. A concept-profile page corresponding to a concept node 556 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 558 and a "used" edge (as illustrated in FIG. 5C) between user nodes 554 corresponding to the user and concept nodes 556 corresponding to the song and application to indicate that the user listened to the song and used the application. Moreover, the social-networking system may create a "played" edge 558 (as illustrated in FIG. 5C) between concept nodes 556 corresponding to the song and the application to indicate that the particular song was played by the particular application. In this case, "played" edge 558 corresponds to an action performed by an external application (SPOTIFY) on an external audio file (the song "Across the Sea"). Although this disclosure describes particular edges 558 with particular attributes connecting user nodes 554 and concept nodes 556, this disclosure contemplates any suitable edges 558 with any suitable attributes connecting user nodes 554 and concept nodes 556. Moreover, although this disclosure describes edges between a user node 554 and a concept node 556 representing a single relationship, this disclosure contemplates edges between a user node 554 and a concept node 556 representing one or more relationships. As an example and not by way of limitation, an edge 558 may represent both that a user likes and has used at a particular concept. Alternatively, another edge 558 may represent each type of relationship (or multiples of a single relationship) between a user node 554 and a concept node 556 (as illustrated in FIG. 5C between user node 554 for user "Edwin" and concept node 556 for "SPOTIFY").

In particular embodiments, the social-networking system may create an edge 558 between a user node 554 and a concept node 556 in social graph 538. As an example and not by way of limitation, a user viewing a concept-profile page (such as, for example, by using a web browser or a special-purpose application hosted by the user's client system) may indicate that he or she likes the concept represented by the concept node 556 by clicking or selecting a "Like" icon, which may cause the user's client system to send to the social-networking system a message indicating the user's liking of the concept associated with the concept-profile page. In response to the message, the social-networking system may create an edge 558 between user node 554 associated with the user and concept node 556, as illustrated by "like" edge 558 between the user and concept node 556. In particular embodiments, the social-networking system may store an edge 558 in one or more data stores. In particular embodiments, an edge 558 may be automatically formed by the social-networking system in response to a particular user action. As an example and not by way of limitation, if a first user uploads a picture, watches a movie, or listens to a song, an edge 558 may be formed between user node 554 corresponding to the first user and concept nodes 556 corresponding to those concepts. Although this disclosure describes forming particular edges 558 in particular manners, this disclosure contemplates forming any suitable edges 558 in any suitable manner.

The social graph 538 may further comprise a plurality of product nodes. Product nodes may represent particular products that may be associated with a particular business. A business may provide a product catalog to a consumer-to-business service and the consumer-to-business service may therefore represent each of the products within the product in the social graph 538 with each product being in a distinct product node. A product node may comprise information relating to the product, such as pricing information, descriptive information, manufacturer information, availability information, and other relevant information. For example, each of the items on a menu for a restaurant may be represented within the social graph 538 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 538. The information for a product node may be manipulated by the social-networking system as a product object that encapsulates information regarding the referenced product.

As such, the social graph 538 may be used to infer shared interests, shared experiences, or other shared or common attributes of two or more users of a social-networking system. For instance, two or more users each having an edge to a common business, product, media item, institution, or other entity represented in the social graph 538 may indicate a shared relationship with that entity, which may be used to suggest customization of a use of a social-networking system, including a messaging system, for one or more users.

Messaging Architecture

Figure 6:
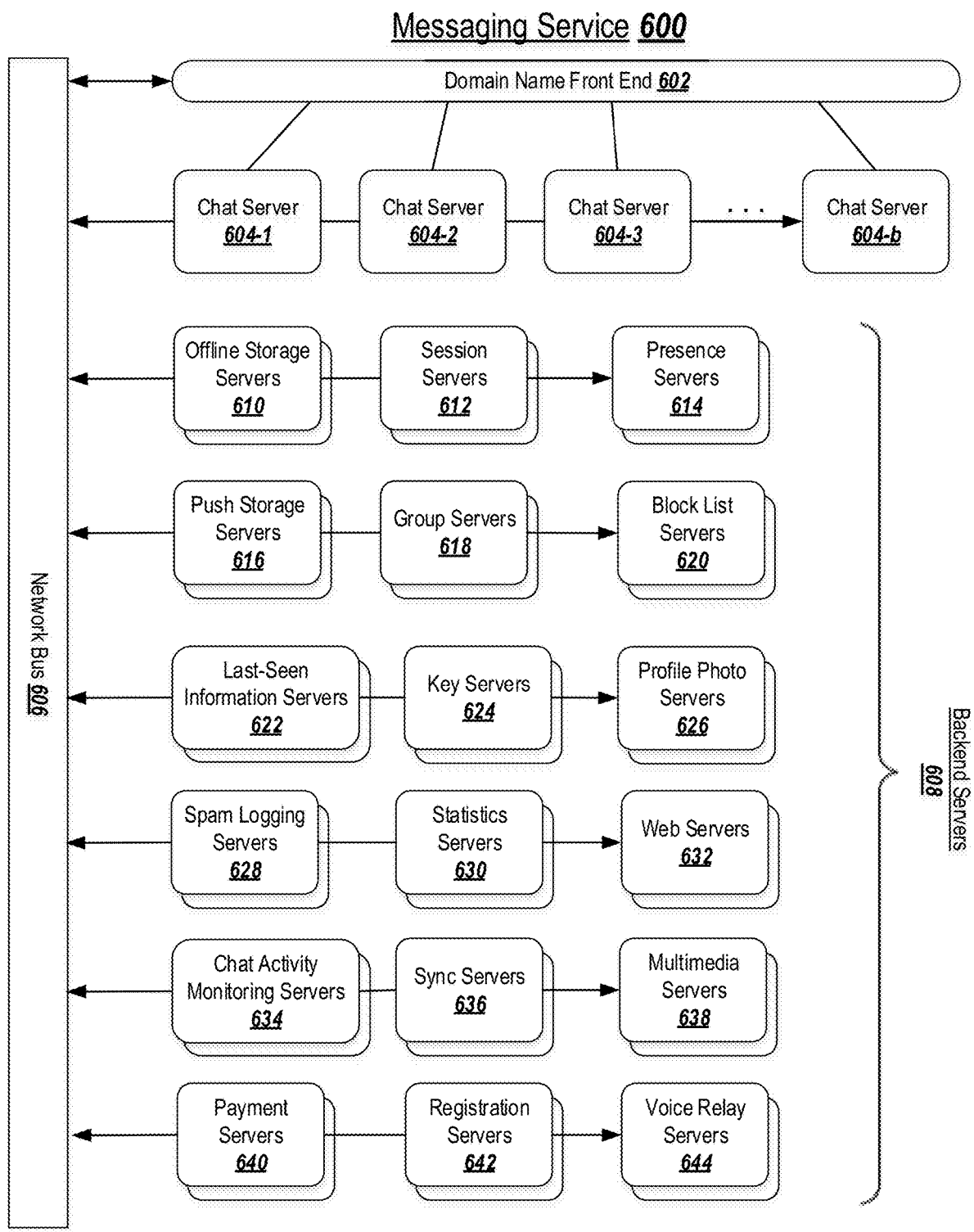
FIG. 6 is a block diagram depicting an example of a system for a messaging service.

FIG. 6 illustrates an embodiment of a plurality of servers implementing various functions of a messaging service 600. It will be appreciated that different distributions of work and functions may be used in various embodiments of a messaging service 600.

The messaging service 600 may comprise a domain name front end 602. The domain name front end 602 may be assigned one or more domain names associated with the messaging service 600 in a domain name system (DNS). The domain name front end 602 may receive incoming connections and distribute the connections to servers providing various messaging services.

The messaging service 602 may comprise one or more chat servers 604. The chat servers 604 may comprise front-end servers for receiving and transmitting user-to-user messaging updates such as chat messages. Incoming connections may be assigned to the chat servers 604 by the domain name front end 602 based on workload balancing.

The messaging service 600 may comprise backend servers 608. The backend servers 608 may perform specialized tasks in the support of the chat operations of the front-end chat servers 604. A plurality of different types of backend servers 608 may be used. It will be appreciated that the assignment of types of tasks to different backend serves 608 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 600 may comprise one or more offline storage servers 610. The one or more offline storage servers 610 may store messaging content for currently-offline messaging clients in hold for when the messaging clients reconnect.

The messaging service 600 may comprise one or more sessions servers 612. The one or more session servers 612 may maintain session state of connected messaging clients.

The messaging service 600 may comprise one or more presence servers 614. The one or more presence servers 614 may maintain presence information for the messaging service 600. Presence information may correspond to user-specific information indicating whether or not a given user has an online messaging client and is available for chatting, has an online messaging client but is currently away from it, does not have an online messaging client, and any other presence state.

The messaging service 600 may comprise one or more push storage servers 616. The one or more push storage servers 616 may cache push requests and transmit the push requests to messaging clients. Push requests may be used to wake messaging clients, to notify messaging clients that a messaging update is available, and to otherwise perform server-side-driven interactions with messaging clients.

The messaging service 600 may comprise one or more group servers 618. The one or more group servers 618 may maintain lists of groups, add users to groups, remove users from groups, and perform the reception, caching, and forwarding of group chat messages.

The messaging service 600 may comprise one or more block list servers 620. The one or more block list servers 620 may maintain user-specific block lists, the user-specific incoming-block lists indicating for each user the one or more other users that are forbidden from transmitting messages to that user. Alternatively or additionally, the one or more block list servers 620 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 600 may comprise one or more last seen information servers 622. The one or more last seen information servers 622 may receive, store, and maintain information indicating the last seen location, status, messaging client, and other elements of a user's last seen connection to the messaging service 600.

The messaging service 600 may comprise one or more key servers 624. The one or more key servers may host public keys for public/private key encrypted communication.

The messaging service 600 may comprise one or more profile photo servers 626. The one or more profile photo servers 626 may store and make available for retrieval profile photos for the plurality of users of the messaging service 600.

The messaging service 600 may comprise one or more spam logging servers 628. The one or more spam logging servers 628 may log known and suspected spam (e.g., unwanted messages, particularly those of a promotional nature). The one or more spam logging servers 628 may be operative to analyze messages to determine whether they are spam and to perform punitive measures, in some embodiments, against suspected spammers (users that send spam messages).

The messaging service 600 may comprise one or more statistics servers 630. The one or more statistics servers may compile and store statistics information related to the operation of the messaging service 600 and the behavior of the users of the messaging service 600.

The messaging service 600 may comprise one or more web servers 632. The one or more web servers 632 may engage in hypertext transport protocol (HTTP) and hypertext transport protocol secure (HTTPS) connections with web browsers.

The messaging service 600 may comprise one or more chat activity monitoring servers 634. The one or more chat activity monitoring servers 634 may monitor the chats of users to determine unauthorized or discouraged behavior by the users of the messaging service 600. The one or more chat activity monitoring servers 634 may work in cooperation with the spam logging servers 628 and block list servers 620, with the one or more chat activity monitoring servers 634 identifying spam or other discouraged behavior and providing spam information to the spam logging servers 628 and blocking information, where appropriate to the block list servers 620.

The messaging service 600 may comprise one or more sync servers 636. The one or more sync servers 636 may sync the communication system 500 with contact information from a messaging client, such as an address book on a mobile phone, to determine contacts for a user in the messaging service 600.

The messaging service 600 may comprise one or more multimedia servers 638. The one or more multimedia servers may store multimedia (e.g., images, video, audio) in transit between messaging clients, multimedia cached for offline endpoints, and may perform transcoding of multimedia.

The messaging service 600 may comprise one or more payment servers 640. The one or more payment servers 640 may process payments from users. The one or more payment servers 640 may connect to external third-party servers for the performance of payments.

The messaging service 600 may comprise one or more registration servers 642. The one or more registration servers 642 may register new users of the messaging service 600.

The messaging service 600 may comprise one or more voice relay servers 644. The one or more voice relay servers 644 may relay voice-over-internet-protocol (VoIP) voice communication between messaging clients for the performance of VoIP calls.

Figure 7:
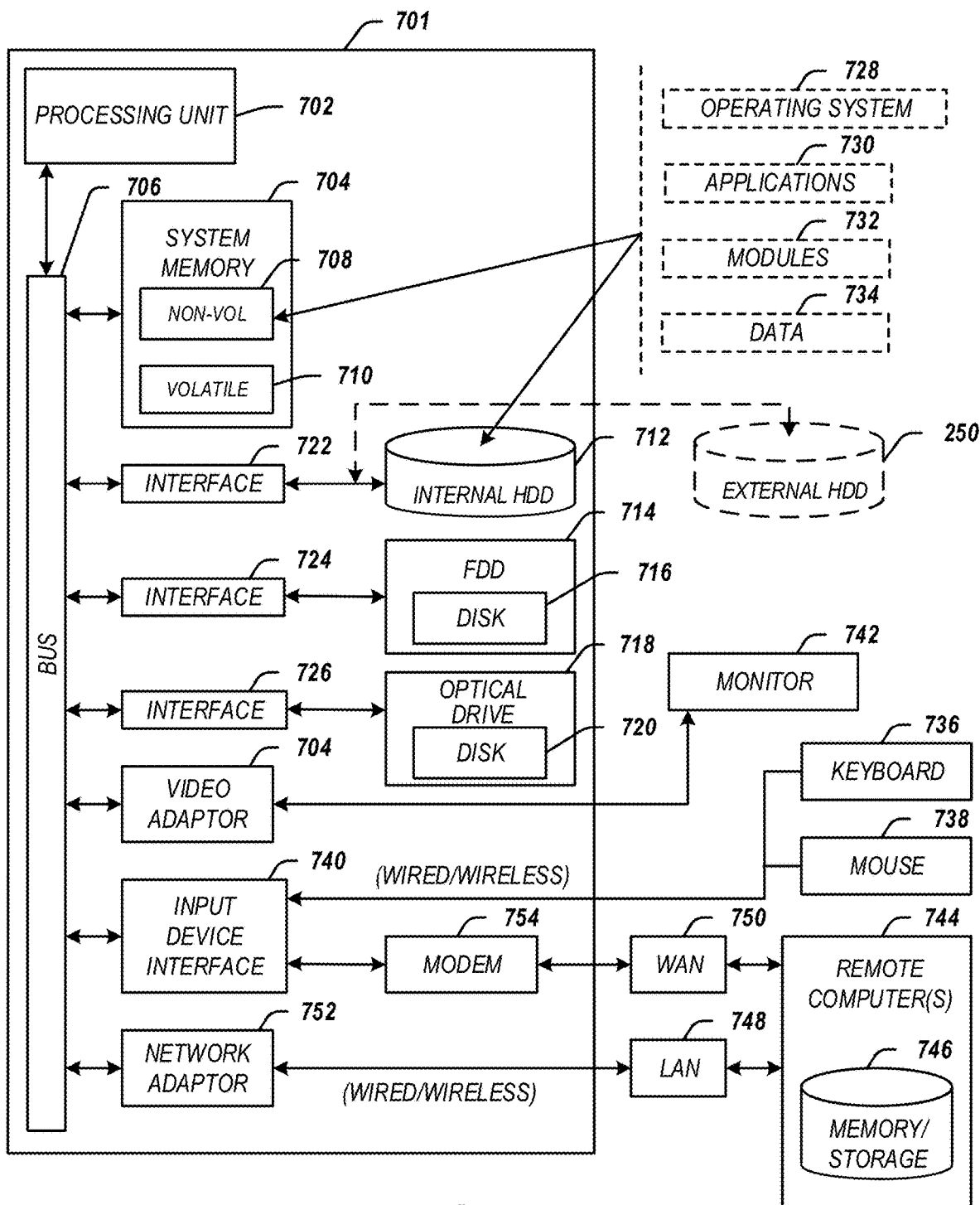
FIG. 7 is a block diagram illustrating an exemplary computing device suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the communication system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
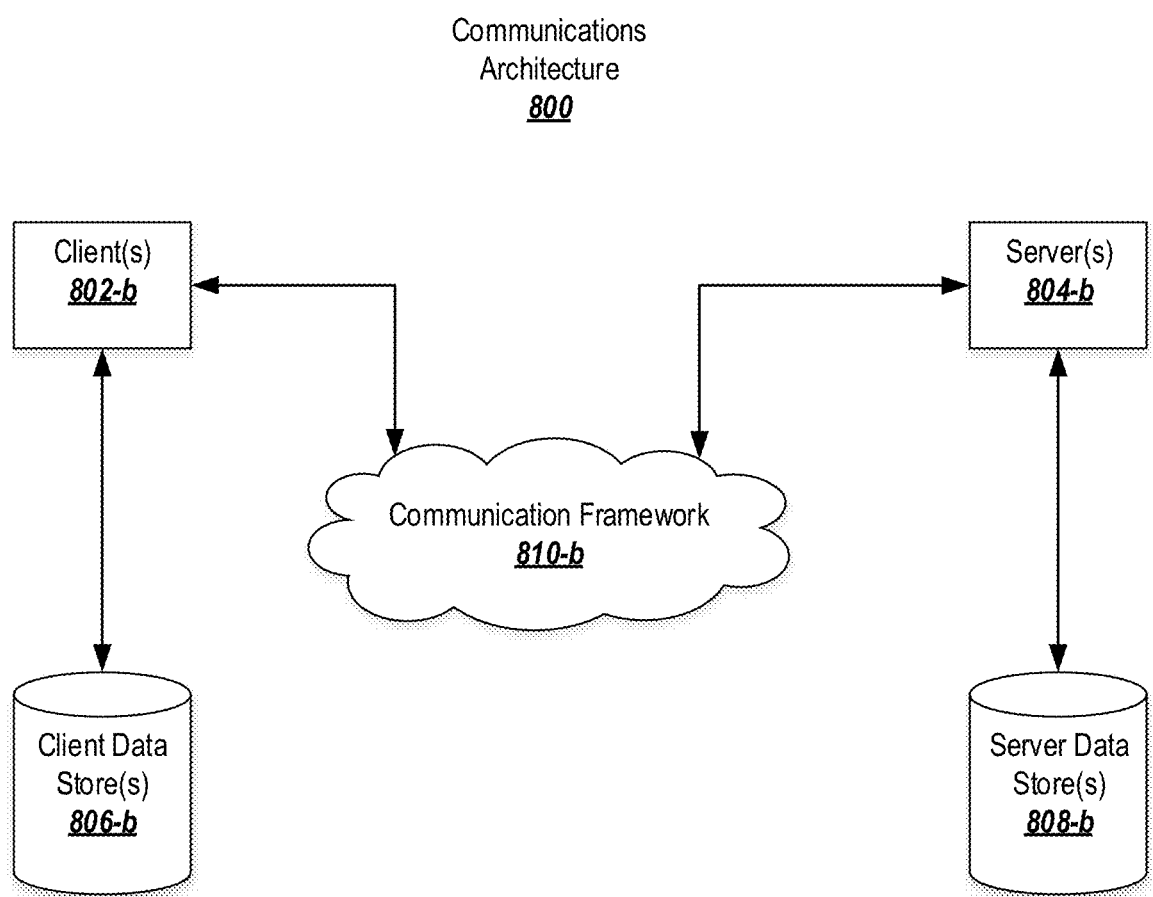
FIG. 8 depicts an exemplary communication architecture.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
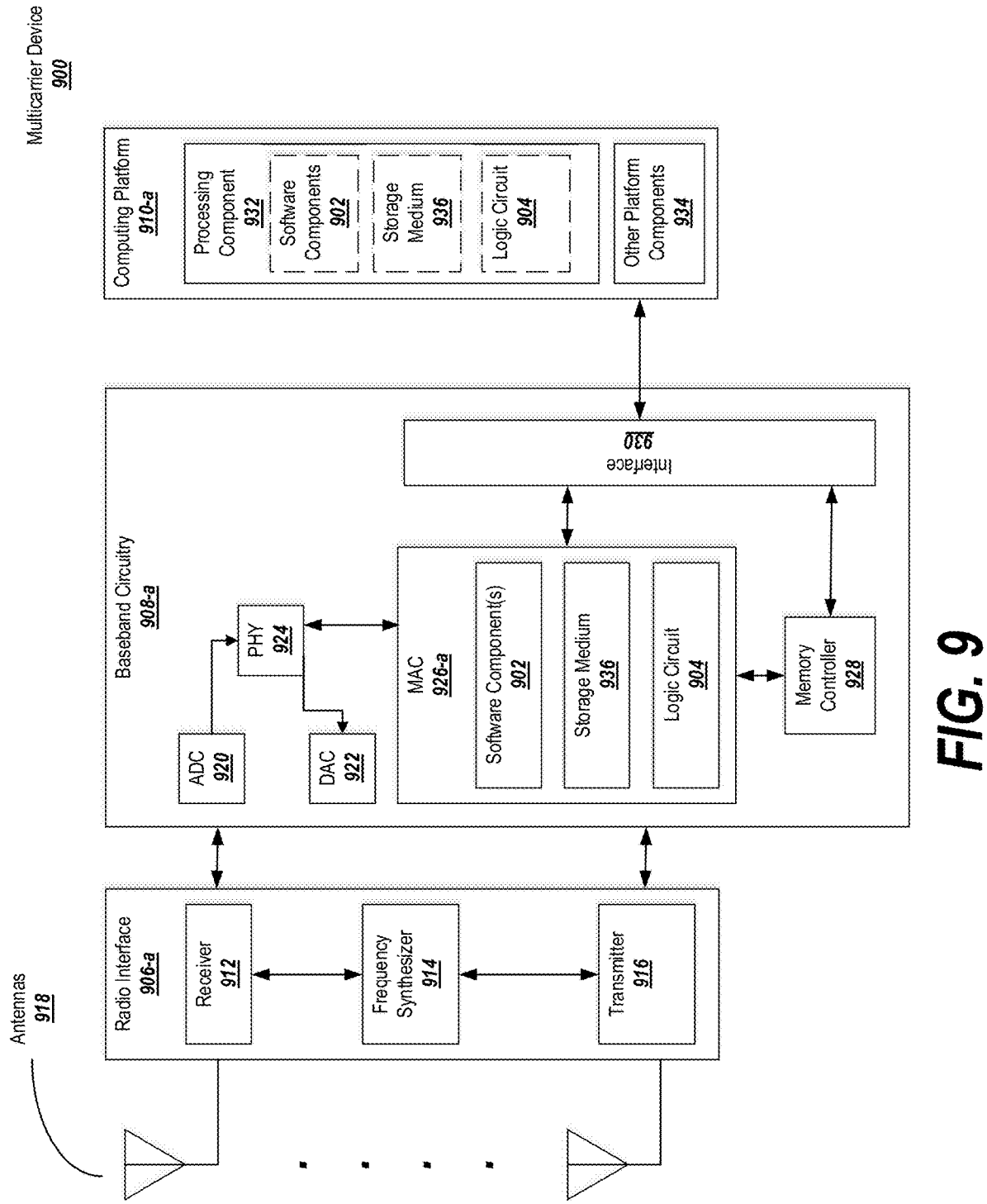
FIG. 9 is a block diagram depicting an exemplary multicarrier communications device.

FIG. 9 illustrates an embodiment of a device 900 for use in a multicarrier OFDM system, such as the communication system 500. The device 900 may implement, for example, software components 902 as described with reference to the messaging component logic 600, the intent determination logic 700, and the group selection logic 800. The device 900 may also implement a logic circuit 904. The logic circuit 904 may include physical circuits to perform operations described for the messaging system 600. As shown in FIG. 9, device 900 may include a radio interface 906, baseband circuitry 908, and a computing platform 910, although embodiments are not limited to this configuration.

The device 900 may implement some or all of the structure and/or operations for the communication system 500 and/or logic circuit 904 in a single computing entity, such as entirely within a single device. Alternatively, the device 900 may distribute portions of the structure and/or operations for the messaging system 600 and/or logic circuit 904 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 906 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 906 may include, for example, a receiver 912, a transmitter 914 and/or a frequency synthesizer 916. The radio interface 906 may include bias controls, a crystal oscillator and/or one or more antennas 918. In another embodiment, the radio interface 906 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 908 may communicate with the radio interface 906 to process receive and/or transmit signals and may include, for example, an analog-to-digital converter 920 for down converting received signals, and a digital-to-analog converter 922 for up-converting signals for transmission. Further, the baseband circuitry 908 may include a baseband or physical layer (PHY) processing circuit 924 for PHY link layer processing of respective receive/transmit signals. The baseband circuitry 908 may include, for example, a processing circuit 926 for medium access control (MAC)/data link layer processing. The baseband circuitry 908 may include a memory controller 928 for communicating with the processing circuit 926 and/or a computing platform 910, for example, via one or more interfaces 930.

In some embodiments, the PHY processing circuit 924 may include a frame construction and/or detection module, in combination with additional circuitry such as a buffer memory, to construct and/or deconstruct communication frames, such as radio frames. Alternatively or in addition, the MAC processing circuit 926 may share processing for certain of these functions or perform these processes independent of the PHY processing circuit 924. In some embodiments, MAC and PHY processing may be integrated into a single circuit.

The computing platform 910 may provide computing functionality for the device 900. As shown, the computing platform 910 may include a processing component 932. In addition to, or alternatively of, the baseband circuitry 908, the device 900 may execute processing operations or logic for the communication system 500 and logic circuit 904 using the processing component 932. The processing component 932 (and/or the PHY 924 and/or MAC 926) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 910 may further include other platform components 934. Other platform components 934 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 900 described herein, may be included or omitted in various embodiments of the device 900, as suitably desired. In some embodiments, the device 900 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of the device 900 may be implemented using any combination of discrete circuitry, application specific integrated circuits (ASICs), logic gates and/or single chip architectures. Further, the features of the device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 936 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled,"

however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A non-transitory computer-readable medium storing:
instructions configured to display an interface to a communications application, the interface comprising a conversation thread including one or more messages associated with one or more recipients;
instructions configured to register a first haptic contact in the interface;
instructions configured to register a second haptic contact in the interface while the first haptic contact is sustained, the second haptic contact proceeding from a first position in the interface to a second position in the interface;
instructions configured to define a drawing stroke from the first position to the second position;
instructions configured to store the drawing stroke as drawing data; and
instructions configured to transmit the drawing stroke to the one or more recipients, wherein the one or more messages are transmitted as message data in a message channel, and the drawing data corresponding to the drawing stroke is transmitted on a real-time data channel distinct from the message channel, and wherein the channels represent communication pathways through a network.

2. The non-transitory computer-readable medium of claim 1, wherein the drawing stroke is defined with reference to a position relative to the one or more messages.

3. The non-transitory computer-readable medium of claim 1, wherein the first haptic contact is registered in a location corresponding to a selected message from the one or more messages, and further comprising instructing a receiving device to rearrange the selected message in the conversation thread to appear consistently on a sending device and the receiving device.

4. The medium of claim 1, further storing instructions configured to rearrange the one or more messages on at least one of a sending device or a receiving device so that the drawing appears consistently with respect to the one or more messages on each device and does not obscure the one or more messages on the receiving device to a greater degree than on the sending device.

5. The non-transitory computer-readable medium of claim 1, further storing instructions configured to display the drawing stroke on the interface, instructions configured to receive an instruction to scroll the interface, and instructions configured to scroll the drawing stroke along with the one or more messages.

6. The non-transitory computer-readable medium of claim 1, further storing instructions configured to define a coordinate layer on the interface, and registering the first position and the second position with respect to the coordinate layer.

7. An apparatus comprising:
a display configured to display an interface to a communications application, the interface comprising a conversation thread including one or more messages associated with one or more recipients;
haptic registration logic configured for execution on a hardware processor to register a first haptic contact in the interface and to register a second haptic contact in the interface while the first haptic contact is sustained, the second haptic contact proceeding from a first position in the interface to a second position in the interface;
drawing stroke logic configured for execution on the hardware processor to define a drawing stroke from the first position to the second position and to store the drawing stroke as drawing data; and
a network interface configured to transmit the drawing stroke to the one or more recipients, wherein the one or more messages are transmitted as message data in a message channel, and the drawing data corresponding to the drawing stroke is transmitted on a real-time data channel distinct from the message channel, and wherein the channels represent communication pathways through a network.

8. The apparatus of claim 7, wherein the drawing stroke is defined with reference to a position relative to the one or more messages.

9. The apparatus of claim 7, wherein the first haptic contact is registered in a location corresponding to a selected message from the one or more messages, and further comprising instructing a receiving device to rearrange the selected message in the conversation thread to appear consistently on a sending device and the receiving device.

10. The apparatus of claim 7, wherein the display is further configured to display the drawing stroke on the interface, the haptic registration logic is further configured to receive an instruction to scroll the interface, and the display is further configured to scroll the drawing stroke along with the one or more messages.

11. The apparatus of claim 7, wherein the drawing stroke logic is further configured to define a coordinate layer on the interface, and registering the first position and the second position is performed with respect to the coordinate layer.

12. An apparatus comprising:
a network receiver, implemented at least partially in hardware and configured to receive, from a sending client device, a drawing stroke associated with a communications application, the drawing stroke defined by a first position at which a second haptic contact was registered at a time when a first haptic contact was sustained and a second position at which the second haptic contact was released while the first haptic contact was sustained and to store the drawing stroke as drawing data; and
a network transmitter, implemented at least partially in hardware and configured to transmit the drawing stroke to a receiving client device, wherein message data from the sending client device is transmitted in a message channel, and the drawing data corresponding to the drawing stroke is transmitted on a real-time data channel distinct from the message channel, and wherein the channels represent communication pathways through a network.

13. The non-transitory computer-readable medium of claim 1, wherein registering a first haptic contact in the interface comprises receiving a report of haptic contact from an operating system of a device running the communications application.

14. The non-transitory computer-readable medium of claim 1, wherein registering the second haptic contact comprises receiving a report of a haptic contact initiation at the first position from an operating system of a device running the communications application, and receiving a report of a haptic contact release at the second position from the operating system.

15. The non-transitory computer-readable medium of claim 3, wherein a report is received from an operating system of a device running the communications application designating the location corresponding to the selected message, and the communications application identifies the selected message as a reference message.

16. The non-transitory computer-readable medium of claim 1, further storing instructions configured to render the drawing stroke in the interface as the second haptic contact is sustained.

17. The non-transitory computer-readable medium of claim 1, further comprising aggregating a plurality of drawing strokes, and transmitting the aggregated drawing strokes to the one or more recipients.

* * * * *